United States Patent
Yen et al.

(10) Patent No.: US 11,153,524 B1
(45) Date of Patent: Oct. 19, 2021

(54) HIGH PRECISION PIXEL CIRCUIT AND METHOD THEREOF

(71) Applicant: PixArt Imaging Incorporation, Hsinchu (TW)

(72) Inventors: Wen-Cheng Yen, Hsinchu (TW); Ren-Chieh Liu, Hsinchu (TW)

(73) Assignee: PIXART IMAGING INCORPORATION, Hsinchu (TW)

( * ) Notice: Subject to any disclaimer, the term of this patent is extended or adjusted under 35 U.S.C. 154(b) by 0 days.

(21) Appl. No.: 17/028,945

(22) Filed: Sep. 22, 2020

(51) Int. Cl.
  *H04N 5/378* (2011.01)
  *H04N 5/363* (2011.01)
  *H04N 5/355* (2011.01)

(52) U.S. Cl.
  CPC ............ *H04N 5/378* (2013.01); *H04N 5/355* (2013.01); *H04N 5/363* (2013.01)

(58) Field of Classification Search
  CPC ........ H04N 5/378; H04N 5/355; H04N 5/363; H04N 5/3745; H04N 5/374
  See application file for complete search history.

(56) References Cited

U.S. PATENT DOCUMENTS

| | | | | |
|---|---|---|---|---|
| 6,040,568 A | * | 3/2000 | Caulfield ................. | H04N 5/33 250/208.1 |
| 2002/0134913 A1 | * | 9/2002 | Hosier .............. | H01L 27/14831 250/208.1 |
| 2009/0256060 A1 | * | 10/2009 | Meynants ......... | H01L 27/14612 250/208.1 |

* cited by examiner

*Primary Examiner* — Nicholas G Giles
(74) *Attorney, Agent, or Firm* — Tung & Associates

(57) ABSTRACT

The present invention provides a pixel circuit. A first S/H stage and the second S/H stage are connected in cascade between a buffer amplifier and an amplifier circuit. During a first and a second time period, a buffered output signal having a first voltage and a second voltage generated by the buffer amplifier are stored serially to the first S/H stage and the second S/H stage. The amplifier circuit senses the first voltage and the second voltage stored in the first S/H stage and the second S/H stage independently for generating a first output signal and a second output signal correspondingly. A calibrated signal is generated according to the first output signal and the second output signal.

31 Claims, 25 Drawing Sheets

HIGH PRECISION PIXEL CIRCUIT AND METHOD THEREOF

BACKGROUND OF THE INVENTION

Field of Invention

The present invention relates to a pixel circuit. Particularly it relates to a high precision pixel circuit. The present invention relates to a method of operating the pixel circuit.

Description of Related Art

Relevant prior patents are U.S. Pat. Nos. 8,569,671, 8,754,357, EP2109306B1, which solve the issue by different approaches from the present invention.

FIG. 1A shows a prior art pixel circuit (pixel circuit 101A). The pixel circuit 101A sample and holds buffered voltages related to voltages on the floating diffusion node FD serially by the sample-and-hold (S/H) circuits 26 and 36, and reads out the voltages from the S/H circuits 26 and 36 through a single read buffer 48 serially.

A drawback of the prior art pixel circuit 101A is that when reading out the voltage from the S/H circuit 26, the charge of the capacitor C26 will be redistributed with the capacitor C36, the signal level is reduced, which leads to lower SNR.

FIG. 1B shows a prior art pixel circuit (pixel circuit 101B). The pixel circuit 101B sample and holds buffered voltages related to voltages on the floating diffusion node FD in parallel by the S/H circuits 27 and 37, and reads out the voltages from the S/H circuits 27 and 37 in parallel through read buffers 48 and 49.

A drawback of the prior art pixel circuit 101B is that the offset between the read buffers 48 and 49 causes extra errors when reading the voltages from the S/H circuits 27 and 37.

Compared to the prior art 101A, the pixel circuit of the present invention is advantageous in that the voltages of the S/H circuits are read out independently to achieve high SNR.

Compared to the prior art 101B, the pixel circuit of the present invention is advantageous in that offset of read buffers can be canceled out.

SUMMARY OF THE INVENTION

From one perspective, the present invention provides a
In one embodiment,
From one perspective, the present invention provides a pixel circuit, comprising: a photo-sensitive element, configured to operably generate charge in response to incident radiation; a floating diffusion node; a reset transistor, configured to operably dissipate charge on the floating diffusion node; a transfer gate, connected between the photo-sensitive element and the floating diffusion node, configured to operably control transfer of charge to the floating diffusion node; a buffer amplifier having an input connected to the floating diffusion node, configured to operably generate a buffered output signal according to a voltage on the floating diffusion node; an amplifier circuit; a first sample-and-hold (S/H) stage; and a second S/H stage, wherein the first S/H stage and the second S/H stage are connected in cascade between the buffer amplifier and the amplifier circuit; wherein the second S/H stage is configured to operably sample, or to operably sample and hold the buffered output signal to generate a second S/H signal, and the first S/H stage is configured to operably sample and hold the second S/H signal to generate a first S/H signal; wherein the amplifier circuit is electrically connected to the output of the first S/H stage and an output of the second S/H stage independently; wherein during a first time period of a global exposure cycle, the second S/H stage samples the buffered output signal having a first voltage to generate the second S/H signal having the first voltage, and the first S/H stage samples and holds the second S/H signal to generate the first S/H signal having the first voltage, wherein the first voltage relates to a first state of the floating diffusion node; wherein during a second time period of the global exposure cycle, the second S/H stage samples and holds the buffered output signal having a second voltage to generate the second S/H signal having the second voltage, wherein the second voltage relates to a second state of the floating diffusion node; wherein during a third time period, the first S/H signal having the first voltage and the second S/H signal having the second voltage are sensed by the amplifier circuit independently for generating a first output signal and a second output signal correspondingly.

In one embodiment, the amplifier circuit senses the first S/H signal without the need of sensing the second S/H signal, and senses the second S/H signal without the need of sensing the first S/H signal.

In one embodiment, the amplifier circuit includes: a first read amplifier having an input for receiving the first S/H signal; and a second read amplifier having an input for receiving the second S/H signal; wherein during an equalizing time period, the first S/H signal and the second S/H signal are equalized such that both the first S/H signal and the second S/H signal have an equalized voltage; wherein during a fourth time period, the first read amplifier senses the first S/H signal having the equalized voltage for generating a first offset signal and the second read amplifier senses the second S/H signal having the equalized voltage for generating a second offset signal.

In one embodiment, an offset compensated signal is generated according to the first output signal, the second output signal, the first offset signal and the second offset signal.

In one embodiment, the first state corresponds to a reset state, wherein in the reset state, charge on the floating diffusion node is fully dissipated by pulsing the reset transistor; and wherein the second state corresponds to a sensing state, wherein in the sensing state, charge of the photo-sensitive element after an exposure time period is fully transferred to the floating diffusion node by pulsing the transfer gate.

In one embodiment, the buffer amplifier includes a sense buffer transistor having a gate connected to the floating diffusion node, and a source connected to an output of the buffer amplifier for generating the buffered output signal, and a drain connected to a buffer supply signal.

In one embodiment, prior to the sense buffer transistor sensing the first state or sensing the second state of the floating diffusion node, the buffer supply signal is pulsed low to reset the buffered output signal.

In one embodiment, the buffer amplifier further includes a current source connected to the source of the sense buffer transistor.

In one embodiment, the first read amplifier includes: a first read buffer transistor having a gate connected to the output of the first S/H stage; and a first read switch, connected between a source of the first read buffer transistor and an output of the first read amplifier; wherein the second read amplifier includes: a second read buffer transistor having a gate connected to the output of the second S/H stage; and a second read switch, connected between a source of the second read buffer transistor and an output of the second read amplifier.

In one embodiment, the sense buffer transistor and the first read buffer transistor are formed in complementary conductive types, and/or the sense buffer transistor and the second read buffer transistor are formed in complementary conductive types, so that a level offset of the sense buffer transistor and a level offset of the of the first read buffer transistor cancel out, and/or a level offset of the sense buffer transistor and a level offset of the of the second read buffer transistor cancel out.

In one embodiment, an output of the first read amplifier and an output of the second read amplifier are shorted and connected to a pixel line.

In one embodiment, an output of the first read amplifier is connected to a first pixel line, and an output of the second read amplifier is connected to a second pixel line.

In one embodiment, a capacitance on the floating diffusion node is adjustable by an adjusting signal such that the pixel circuit operates in at least one of the following modes: (1) a low conversion gain mode, wherein the floating diffusion node has a first equivalent capacitance; (2) a high conversion gain mode, wherein the floating diffusion node has a second equivalent capacitance which is smaller than the first equivalent capacitance; and/or (3) an HDR mode, wherein the floating diffusion node switches between the first equivalent capacitance and the second equivalent capacitance.

In one embodiment, the pixel circuit further comprises: an adjusting switch, connected between the reset transistor and the floating diffusion node and controlled by the adjusting signal; and an adjusting capacitor, connected to a joint node of the reset transistor and the adjusting switch; wherein when the adjusting switch is ON, the floating diffusion node has the first equivalent capacitance, wherein when the adjusting switch is OFF, the floating diffusion node has the second equivalent capacitance.

In one embodiment, in the low conversion gain mode, the adjusting switch is ON, wherein the first state corresponds to a reset state, wherein in the reset state, charge on the floating diffusion node is fully dissipated by pulsing the reset transistor; and wherein the second state corresponds to a sensing state, wherein in the sensing state, charge of the photo-sensitive element after an exposure time period is fully transferred to the floating diffusion node by pulsing the transfer gate; wherein a low-gain calibrated signal is generated according to the first output signal and the second output signal.

In one embodiment, in the high conversion gain mode, the adjusting switch is OFF, wherein the first state corresponds to a reset state, wherein in the reset state, charge on the floating diffusion node is fully dissipated by pulsing the reset transistor; and wherein the second state corresponds to a sensing state, wherein in the sensing state, charge of the photo-sensitive element after an exposure time period is fully transferred to the floating diffusion node by pulsing the transfer gate; wherein a high-gain calibrated signal is generated according to the first output signal and the second output signal.

In one embodiment, in the HDR mode, wherein the first state corresponds to a sensing state in a high conversion gain sub-mode, wherein in the sensing state in the high conversion gain sub-mode, the adjusting switch is OFF, charge of the photo-sensitive element after an exposure time period is fully transferred to the floating diffusion node having the second equivalent capacitance by pulsing the transfer gate; and wherein the second state corresponds to a sensing state in a low conversion gain sub-mode, wherein in the sensing state in the low conversion gain sub-mode, the adjusting switch is ON, charge of the floating diffusion node is redistributed according to the first equivalent capacitance; wherein an HDR signal is generated according to the first output signal and the second output signal.

In one embodiment, the amplifier circuit includes: a read amplifier, configured to operably sense the first S/H signal having the first voltage or the second S/H signal having the second voltage for generating the first output signal or the second output signal correspondingly; and a selector circuit, configured to operably select one of the first S/H signal or the second S/H signal to be electrically connected to an input of the read amplifier for generating the first output signal or the second output signal correspondingly during the third time period.

In one embodiment, the buffer amplifier includes a sense buffer transistor having a gate connected to the floating diffusion node, and a source to an output of the buffer amplifier for generating the buffered output signal, and a drain connected to a buffer supply signal.

In one embodiment, prior to the sense buffer transistor sensing the first state or sensing the second state of the floating diffusion node, the buffer supply signal is pulsed low to reset the buffered output signal.

In one embodiment, the buffer amplifier further includes a current source connected to the source of the sense buffer transistor.

In one embodiment, the pixel circuit further comprises: a third S/H stage; and a fourth S/H stage, wherein the third S/H stage and the fourth S/H stage are connected in cascade between the buffer amplifier and the amplifier circuit; wherein the fourth S/H stage is configured to operably sample, or to operably sample and hold the buffered output signal to generate a fourth S/H signal, and the third S/H stage is configured to operably sample and hold the fourth S/H signal to generate a third S/H signal; wherein the pixel circuit operates in the HDR mode; wherein during the first time period and the second time period, the adjusting switch is OFF such that the floating diffusion node has the second equivalent capacitance; wherein during a fifth time period of a global exposure cycle, the fourth S/H stage samples the buffered output signal having a third voltage to generate the fourth S/H signal having a third voltage, and the third S/H stage samples and holds the fourth S/H signal to generate the third S/H signal having the third voltage, wherein the third voltage relates to a third state of the floating diffusion node; wherein during a sixth time period of the global exposure cycle, the fourth S/H stage samples and holds the buffered output signal having a fourth voltage to generate the fourth S/H signal having the fourth voltage, wherein the fourth voltage relates to a fourth state of the floating diffusion node; wherein during the fifth time period and the sixth time period, the adjusting switch is ON such that the floating diffusion node has the first equivalent capacitance; wherein the first state, the second state, the third state and the fourth state corresponds to a reset state in a low conversion gain sub-mode, a sensing state in a high conversion gain sub-mode, the reset state in the high conversion gain sub-mode, and the sensing state in the low conversion gain sub-mode; wherein during a seventh time period, the first S/H signal having the first voltage and the second S/H signal having the second voltage, the third S/H signal having the third voltage and the fourth S/H signal having the fourth voltage are sensed by the amplifier circuit independently for generating the first output signal, the second output signal, a third output signal and a fourth output signal correspondingly; wherein an HDR offset compensated signal is generated according to the first output signal, the second output signal, the third output signal and the fourth output signal.

In one embodiment, the pixel circuit operates according to the following timing sequence: the first time period, the fifth time period, the second time period, the sixth time period, the third time period and the seventh time period.

In one embodiment, each of the first S/H stage and the second S/H stage includes: a holding capacitor, connected to the output of the corresponding S/H stage; and a sampling switch, connected between an input and the output of the corresponding S/H stage.

In one embodiment, each of the first S/H stage, the second S/H stage, the third S/H stage and the fourth S/H stage includes: a holding capacitor, connected to the output of the corresponding S/H stage; and a sampling switch, connected between an input and the output of the corresponding S/H stage.

From another perspective, the present invention provides a method of operating a pixel circuit, the pixel circuit including: a photo-sensitive element, configured to operably generate charge in response to incident radiation; a floating diffusion node; a reset transistor, configured to operably dissipate charge on the floating diffusion node; a transfer gate, connected between the photo-sensitive element and the floating diffusion node, configured to operably control transfer of charge to the floating diffusion node; a buffer amplifier having an input connected to the floating diffusion node, configured to operably generate a buffered output signal according to a voltage on the floating diffusion node; an amplifier circuit; a first sample-and-hold (S/H) stage; and a second S/H stage, wherein the first S/H stage and the second S/H stage are connected in cascade between the buffer amplifier and the amplifier circuit; wherein the second S/H stage is configured to operably sample, or to operably sample and hold the buffered output signal to generate a second S/H signal, and the first S/H stage is configured to operably sample and hold the second S/H signal to generate a first S/H signal; wherein the amplifier circuit is electrically connected to the output of the first S/H stage and an output of the second S/H stage independently; the method comprising: (S10): during a first time period of a global exposure cycle, storing the buffered output signal having a first voltage to the first S/H stage via the second S/H stage, wherein the first voltage relates to a first state of the floating diffusion node; (S20): during a second time period of the global exposure cycle, storing the buffered output signal having a second voltage to the second S/H stage, wherein the second voltage relates to a second state of the floating diffusion node; and (S20): during a third time period, sensing the first voltage and the second voltage by the amplifier circuit independently for generating a first output signal and a second output signal correspondingly.

In one embodiment, the amplifier circuit includes: a first read amplifier having an input for sensing the first S/H stage; and a second read amplifier having an input for sensing the second S/H stage; the method further comprising: (S35) during an equalizing time period, equalizing the first S/H stage and the second S/H stage to store a corresponding equalized voltage in both the first S/H stage and the second S/H stage; (S40) during a fourth time period, sensing the equalized voltage from the first S/H stage by the first read amplifier for generating a first offset signal and sensing the equalized voltage from the second S/H stage by the second read amplifier for generating a second offset signal.

In one embodiment, the method further comprises: (S100) generating an offset compensated signal according to the first output signal, the second output signal, the first offset signal and the second offset signal.

In one embodiment, the method further comprises: (S05): before (S10), pulsing the reset transistor to fully dissipate charge on the floating diffusion node in the first state; and (S15): before (S20), pulsing the transfer gate to fully transfer charge of the photo-sensitive element during a transfer time period in the second state.

In one embodiment, the method further comprises: adjusting a capacitance on the floating diffusion node to operate the pixel circuit optionally in at least one of the following modes: (1) a low conversion gain mode, wherein the floating diffusion node has a first equivalent capacitance, and a low-gain calibrated signal is generated according to the first output signal and the second output signal; (2) a high conversion gain mode, wherein the floating diffusion node has a second equivalent capacitance which is smaller than the first equivalent capacitance, and a high-gain calibrated signal is generated according to the first output signal and the second output signal; and/or (3) an HDR mode, wherein the floating diffusion node switches between the first equivalent capacitance and the second equivalent capacitance.

In one embodiment, the step of operating the pixel circuit in the HDR mode includes: in the first state, adjusting the capacitance of the floating diffusion node to the second equivalent capacitance, and pulsing the transfer gate to fully transfer charge of the photo-sensitive element during a transfer time period; in the second state, adjusting the capacitance of the floating diffusion node to the first equivalent capacitance; and generating an HDR signal according to the first output signal and the second output signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1A:
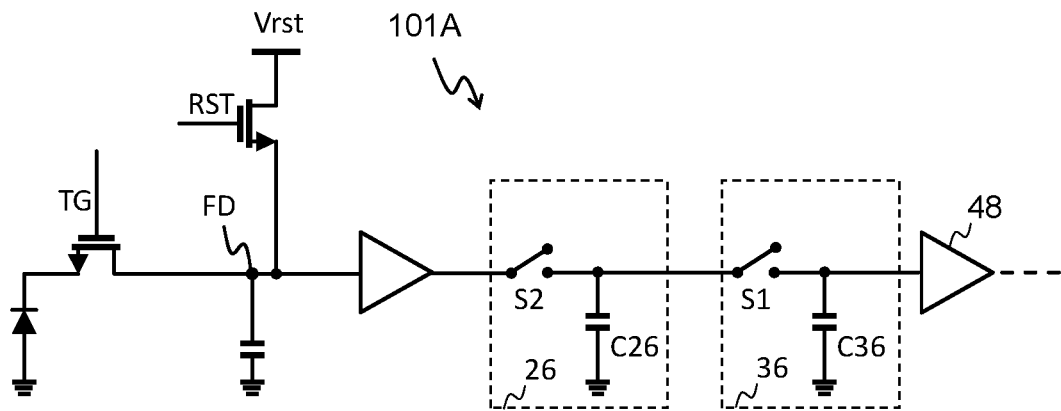
FIG. 1A shows a prior art pixel circuit.
Figure 1B:
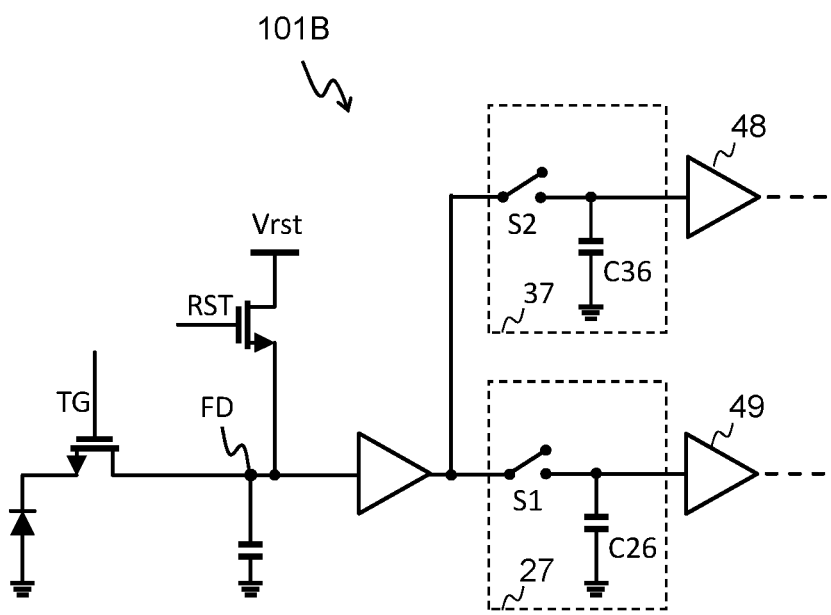
FIG. 1B shows a prior art pixel circuit.
Figure 2:
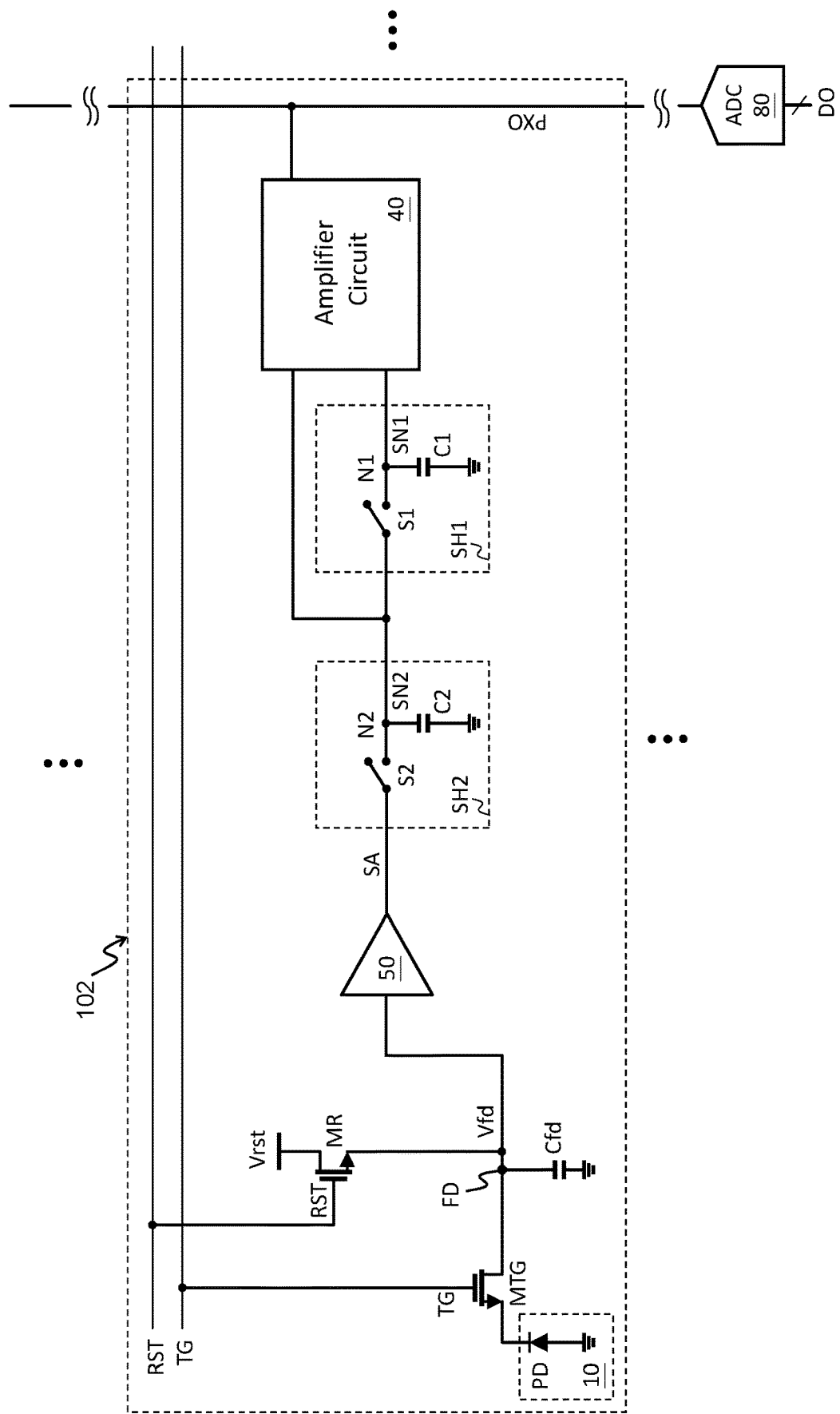
FIG. 2 shows one embodiment of the pixel circuit according to the present invention.

FIG. 2 shows one embodiment of the pixel circuit (pixel circuit 102) according to the present invention. The pixel circuit 102 comprises a photo-sensitive element 10, a floating diffusion node FD, a reset transistor MR, a transfer gate MTG, a buffer amplifier 50, a first sample-and-hold (S/H) stage SH1, a second S/H stage SH2 and an amplifier circuit 40.

The photo-sensitive element 10 is configured to operably generate charge in response to incident radiation, for example light. The photo-sensitive element 10 can be for example a photo diode PD as shown in FIG. 2. The photo-sensitive element 10 is exposed to incident radiation controlled by a shutter during an exposure period to accumulate charge on the photo diode PD. The amount of the accumulated charge is proportional to the intensity of light.

An array of the pixel circuit 102 can form an imager. Moreover, the array of the pixel circuit 102 can be exposed with a global shutter scheme, wherein all the pixel circuits in the array can be exposed with a global shutter during a same exposure time period and the charge level of each pixel circuit can be read out later in a specific sequence.

The floating diffusion node FD can be connected to a capacitor Cfd formed by for example a P-N junction of a floating diffusion region adjacent to the transfer gate MTG.

The transfer gate MTG is electrically connected between the photo-sensitive element 10 and the floating diffusion node FD, and is configured to operably control transfer of charge to the floating diffusion node FD from the photo-sensitive element 10 by controlling voltage levels of the transfer gate signal TG.

The reset transistor MR is configured to operably dissipate charge on the floating diffusion node FD in a reset state. When the reset transistor MR is ON, a voltage Vfd on the floating diffusion node FD is reset to the reset voltage Vrst (e.g. a low level), such that the pixel circuit 102 is in the reset state. The reset transistor MR is controlled by the reset signal RST.

An input of the buffer amplifier 50 is connected to the floating diffusion node FD. The buffer amplifier 50 is configured to operably generate a buffered output signal SA according to the voltage Vfd on the floating diffusion node FD.

The first S/H stage SH1 and the second S/H stage SH2 are connected in cascade between the buffer amplifier 50 and the amplifier circuit 40. The second S/H stage SH2 is configured to operably sample, or to operably sample and hold the buffered output signal SA to generate a second S/H signal SN2 on the node N2, and the first S/H stage SH1 is configured to operably sample and hold the second S/H signal SN2 to generate a first S/H signal SN1 on the node N1.

The amplifier circuit 40 is electrically connected to the output (i.e. the node N1) of the first S/H stage SH1 and an output (i.e. the node N2) of the second S/H stage SH2 independently. More specifically, the amplifier circuit 40 can sense the first S/H signal SN1 directly, irrelevant to the charge (also voltage equivalently) stored in the second S/H stage SH2, and can sense the second S/H signal SN2 directly, irrelevant to the charge stored in the first S/H stage SH1.

Still referring to FIG. 2, in one embodiment, the first S/H stage SH1 includes a sampling switch S1 and a holding capacitor C1. The sampling switch S1 is coupled between the input and the output of the first S/H stage SH1, and is connected to the holding capacitor C1 through the output of the first S/H stage SH1. The sampling switch is controlled by an S/H control signal SC1. The second S/H stage SH2 includes a sampling switch S2 and a holding capacitor C2. The sampling switch S2 is coupled between the input and the output of the second S/H stage SH2, and is connected to the holding capacitor C2 through the output of the second S/H stage SH2. The sampling switch S2 is controlled by an S/H control signal SC2.

Figure 3:
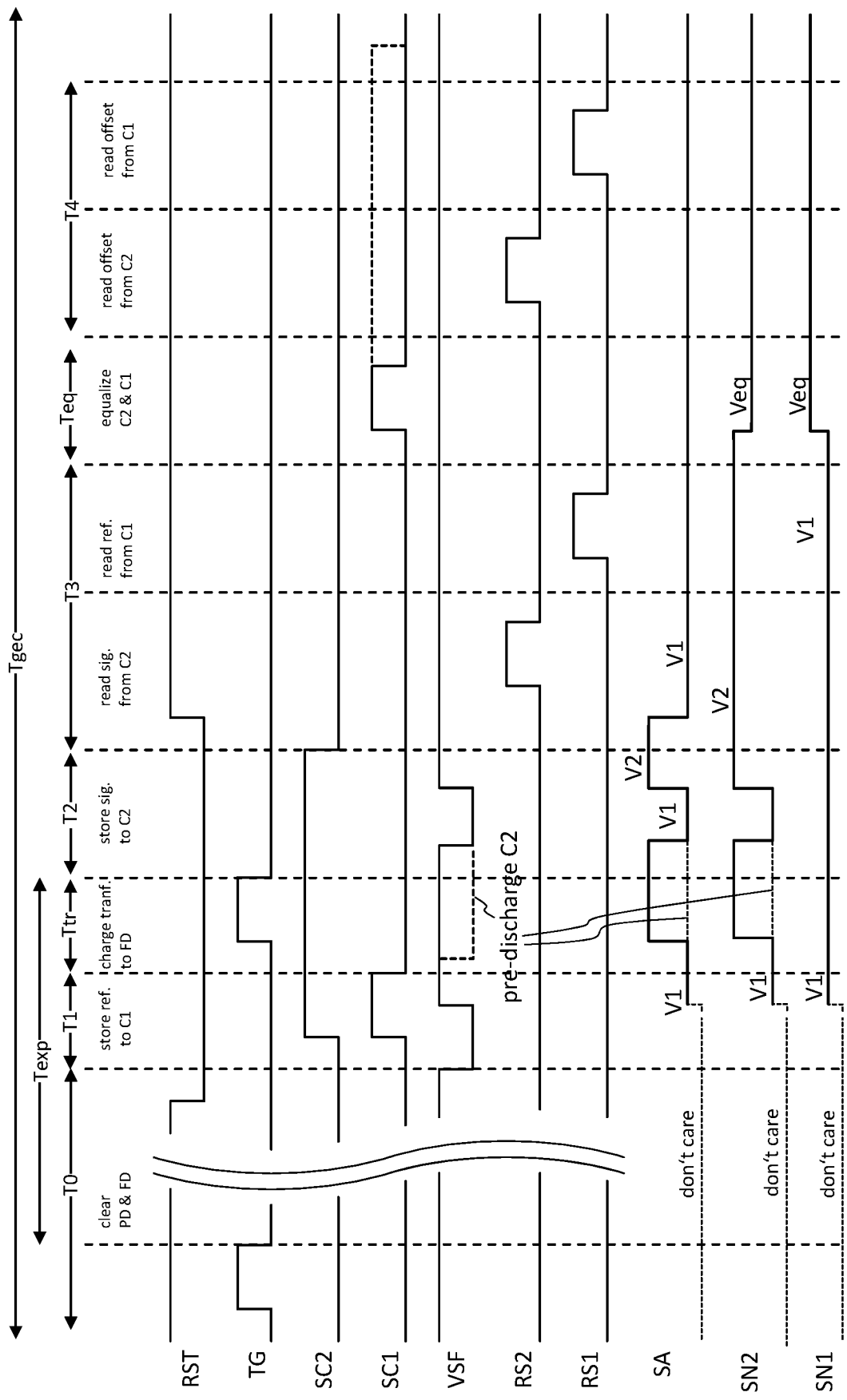
FIG. 3 shows exemplary operation waveforms of corresponding embodiments according to the present invention.

FIG. 3 shows exemplary operation waveforms of corresponding embodiments according to the present invention. Referring to FIG. 2 and FIG. 3, in one embodiment, during a first time period (e.g. T1 in FIG. 3) of a global exposure cycle (e.g. Tgec in FIG. 3), the second S/H stage SH2 samples the buffered output signal SA to generate a second S/H signal SN2 having a first voltage V1 at the node N2. Note that the sampling switch S2 is ON during the first time period T1.

At the same time, during the first time period T1, the first S/H stage SH1 samples and holds the second S/H signal SN2 having the first voltage V1, so that the output (i.e. first S/H signal SN1) of the first S/H stage SH1 is also at the first voltage V1. Note that the sampling switch S1 is pulsed ON (by controlling the control signal SC1) during the first time period T1 and is OFF before the end of the first time period T1 (i.e. storing V1 to SH1). In one embodiment, the reset transistor MR is turned OFF (the reset signal RST switches to a low level during T0) before the first S/H stage SH1 and the second S/H stage SH2 starts to sample.

In one embodiment, the first voltage V1 relates to a first state of the floating diffusion node FD. In one embodiment, the first state of the floating diffusion node FD can correspond to for example the aforementioned reset state. More specifically, the first time period corresponds to for example T1 as shown in FIG. 3, wherein the reset transistor MR is controlled ON (i.e. the reset signal RST is at a high level) before the first time period T1 to reset the voltage of the floating diffusion node FD to the reset voltage Vrst (e.g. low level, i.e. charge on the floating diffusion node FD is fully dissipated during time period T0). In one embodiment, the transfer gate signal TG is also pulsed high to reset the photo-sensitive element 10 to the reset voltage Vrst at the same time during time period T0 (i.e. charge on the photo-sensitive element 10 is also fully dissipated during time period T0). In one embodiment, in the reset state, the voltage level of the buffered output signal SA corresponds to V1.

Note that since the second S/H stage SH2 samples the buffered output signal SA having the voltage V1 during the first time period T1, the second S/H signal SN2 is also at the level of V1. And since the first S/H stage SH1 samples and holds the second S/H signal SN2 having the voltage V1 during the first time period T1, the voltage on the output of the S/H stage SH1 (i.e. the first S/H signal SN1) is also at the level of V1.

Still referring to FIG. 2 and FIG. 3, during a second time period (e.g. T2), the second S/H stage SH2 samples and holds the buffered output signal SA having a voltage V2 to generate the second S/H signal SN2 having the second voltage V2. In one embodiment, the second voltage V2 relates to a second state of the floating diffusion node FD. In one embodiment, the second state of the floating diffusion node FD can correspond to for example a sensing state. More specifically, in one embodiment, as shown in FIG. 3, in the second state (i.e. the sensing state), during the transfer time period Ttr, charge of the photo-sensitive element 10 after an exposure time period Texp is fully transferred to the floating diffusion node FD by pulsing the transfer gate MTG (by controlling the transfer gate signal TG pulsing during Ttr), such that the voltage Vfd on the floating diffusion node FD represents the charge level sensed by the photo diode PD during the exposure time period Texp. After the charge transferred to the floating diffusion node FD, the level of the buffered output signal SA becomes V2, as shown in FIG. 3. Note that the second voltage V2 of the buffered output signal SA also represents the level of the charge level sensed by the photo diode PD during the exposure time period Texp, as an amplified version depending on the configuration of the amplifier circuit 40.

Still referring to FIG. 2 and FIG. 3, in one embodiment, during a third time period T3, the first S/H signal SN1 having the first voltage V1 and the second S/H signal SN2 having the second voltage V2 are sensed by the amplifier circuit 40 independently to generate a corresponding first output signal and a corresponding second output signal respectively.

From one perspective, when the first state corresponds to the reset state and the second state corresponds to the sensing state, in the reset state, the first output signal corresponds to a reference signal which reflects the reset state on the floating diffusion node FD, and in the sensing state, the second output signal corresponds to a sensed signal which reflects the voltage Vfd on the floating diffusion node FD after an exposure of the photo-sensitive element 10 and charge being transferred to the floating diffusion node FD.

In one embodiment, a noise calibrated signal is generated according to the first output signal and the second output signal. In one embodiment, when the first output signal corresponds to the aforementioned reset state and the second output signal corresponds to the aforementioned sensing state, the noise calibrated signal can be obtained by for example subtracting the first output signal (i.e. the reset signal) from the second output signal (i.e. the sensed signal), wherein a noise of the photo diode PD existing in the second output signal can be canceled out by the subtracting the first output signal which also contains the noise.

In one embodiment, the first output signal and the second output signal can be corresponded to the corresponding voltage levels on the pixel lines PXO as shown in FIG. 2.

As shown in FIG. 2, in one embodiment, plurality of the pixel circuits (e.g. 102) can be arranged in at least one column and share the same pixel line PXO. An ADC (analog to digital converter) 80 can be employed to convert the voltage levels on the pixel line PXO. In this embodiment, the first output signal and the second output signal can be corresponded to the corresponding output digital codes (i.e. DO shown in FIG. 2) on converted by the ADC 80.

Still referring to FIG. 2, from one perspective, that the first S/H signal SN1 having the first voltage V1 and the second S/H signal SN2 having the second voltage V2 are sensed by the amplifier circuit 40 independently means that the first output signal is generated by sensing the first S/H signal SN1 directly and the second output signal is generated by sensing the second S/H signal SN2 directly.

Still referring to FIG. 2, from another perspective, in this embodiment, the term "independently" means that the amplifier circuit 40 senses the first S/H signal SN1 without the need of sensing the second S/H signal SN2, and senses the second S/H signal SN2 without the need of sensing the first S/H signal SN1.

Referring to FIG. 3, in this embodiment, during a equalizing time period (Teq), the first S/H signal SN1 having the first voltage V1 and the second S/H signal SN2 having the second voltage V2 are equalized such that both the first S/H signal SN1 and the second S/H signal SN2 have an equalized voltage Veq after the equalizing time period Teq.

Figure 4:
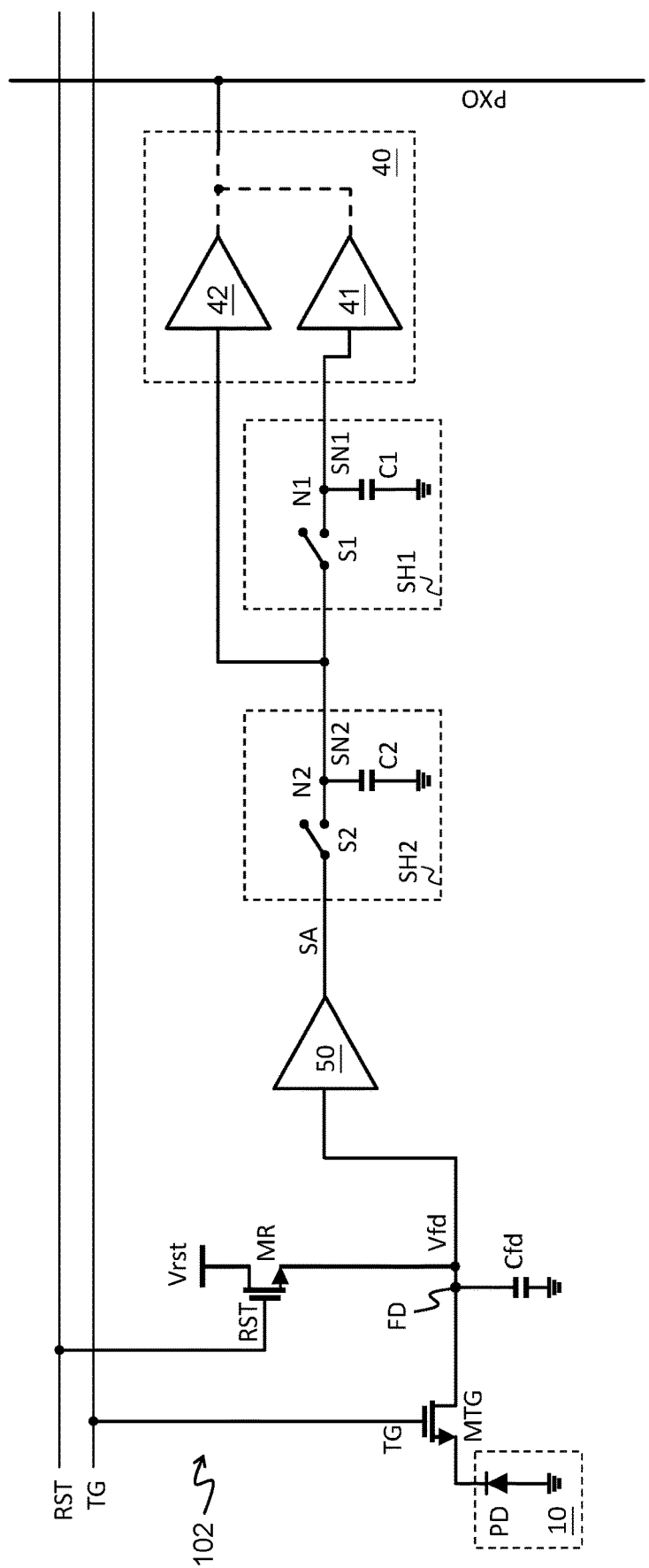
FIG. 4 shows one embodiment of the amplifier circuit of the pixel circuit according to the present invention.

FIG. 4 shows one embodiment of the amplifier circuit (amplifier circuit 40) of the pixel circuit according to the present invention. As shown in FIG. 4, in one embodiment, the amplifier circuit 40 includes a first read amplifier 41 and a second read amplifier 42. The input of the first read amplifier 41 is connected to the output (i.e. N1) of the first S/H stage SH1. The input of the second read amplifier 42 is connected to the output (i.e. N2) of the second S/H stage SH2.

Referring to FIG. 4 and FIG. 3, in this embodiment, during a fourth time period T4, the first read amplifier 41 senses the first S/H signal SN1 having the equalized voltage Veq for generating a first offset signal Sos1 and the second read amplifier 42 senses the second S/H signal SN2 having the equalized voltage Veq for generating a second offset signal Sos2. The offset signal Sos1 and Sos2 represents offset of the first read amplifier 41 and the second read amplifier 42 when sensing a same signal (e.g. the equalized voltage Veq, and can be further canceled out in later signal sensing process).

Note that in one embodiment, the switch S1 can be turned on and off again during Teq (i.e. SC1, the solid line) for equalizing. In one alternative embodiment, the switch S1 can be turned on till the end of sensing both the first S/H signal SN1 and the second S/H signal SN2 (i.e. SC1, the dashed line).

In one embodiment, an offset compensated signal Sosc is generated according to the first output signal, the second output signal, the aforementioned first offset signal Sos1 and the second offset signal Sos2. In a non-limiting example, The offset compensated signal Sosc can be obtained by:

$$Sosc = (\text{the second output signal} - Sos2) - (\text{the first output signal} - Sos1).$$

In this embodiment, the aforementioned noise and the offset of the sensed signal (i.e. the second output signal) are both canceled out.

Figure 5:
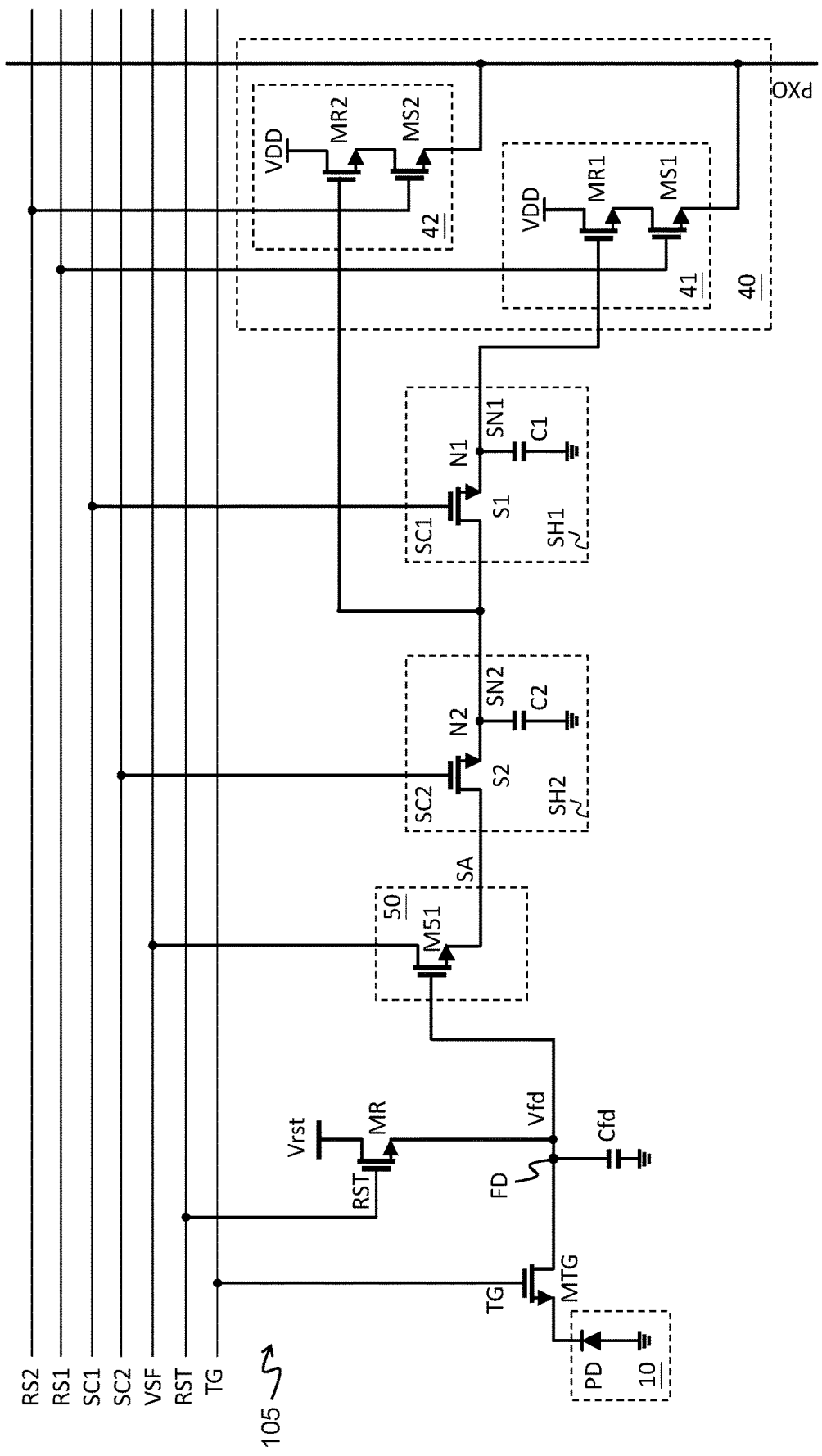
FIG. 5 shows a more specific schematic diagram of an embodiment of the pixel circuit according to the present invention.

FIG. 5 shows a more specific schematic diagram of an embodiment of the pixel circuit according to the present invention. As shown in FIG. 5, in one embodiment, the buffer amplifier 50 includes a sense buffer transistor M51 having a gate connected to the floating diffusion node FD and a source connected to the input of the second S/H stage SH2 and a drain connected to a buffer supply signal VSF. From one perspective, in this embodiment, the sense buffer transistor M51 employs the sense buffer transistor M51 which is configured as a source follower for generating the buffered output signal SA.

Referring to FIG. 3 and FIG. 5, in one embodiment, prior to the sense buffer transistor M51 sensing the first state or sensing the second state of the floating diffusion node FD (e.g. T1 as shown in FIG. 3), the buffer supply signal VSF is pulsed low to reset the buffered output signal SA. As shown in FIG. 5, in this embodiment, the buffer amplifier 50 employs the sense buffer transistor M51 configured as a source follower stage without pull-down components. In this case, the sense buffer transistor M51 can reflect the rising change of the voltage Vfd on the floating diffusion node FD at the source of the sense buffer transistor M51 (i.e. the buffered output signal SA) but cannot reflect the falling change of the voltage Vfd on the floating diffusion node FD. In one embodiment, before the sense buffer transistor M51 starts to sense the voltage Vfd on the floating diffusion node FD, it is required to pulse low the buffer supply signal VSF (e.g. T1, T2) for resetting the buffered output signal SA so as to sense the voltage Vfd on the floating diffusion node FD later (e.g. end of T2).

Still referring to FIG. 3, in one alternative embodiment, the buffer supply signal VSF is pulsed low to reset the buffered output signal SA again for pre-discharging the second S/H stage SH2 (i.e. VSF, dashed line during Ttr in FIG. 3) before the second S/H stage SH2 holds (i.e. before SC2 turns low).

Still referring to FIG. 3 to FIG. 5, in one embodiment, the first read amplifier 41 includes a first read buffer transistor MR1 and a first read switch MS1. The gate of the first read buffer transistor MR1 is connected to the output of the first S/H stage SH1 and is configured to sense the first S/H signal SN1. The first read switch MS1 is connected between a source of the first read buffer transistor MR1 and the output of the first read amplifier 41 and is configured to control the connection between first read buffer transistor MR1 and the pixel line PXO. The second read amplifier 42 includes a second read buffer transistor MR2 and a second read switch MS2. The gate of the second read buffer transistor MR2 is connected to the output of the second S/H stage SH2 and is configured to sense the second S/H signal SN2. The second read switch MS2 is connected between a source of the second read buffer transistor MR2 and the output of the second read amplifier 42 and is configured to control the connection between second read buffer transistor MR2 and the pixel line PXO.

Still referring to FIG. 3 to FIG. 5, the first read switch MS1 is controlled by a control signal RS1 and the second read switch MS2 is controlled by a control signal RS2. As shown in FIG. 3, when the S/H signal SN1 or the S/H signal SN2 is sensed by the corresponding first read amplifier 41 or the second read amplifier 42 (e.g. during T3, T4), the control signal RS1 or the control signal RS2 is pulsed high accordingly.

Note that in this embodiment as shown in FIG. 3, in the time periods T3 or T4, sensing the second S/H signal is prior to sensing the first S/H signal. However, the order shown herein is not for limiting the scope and can be opposite.

Figure 6:
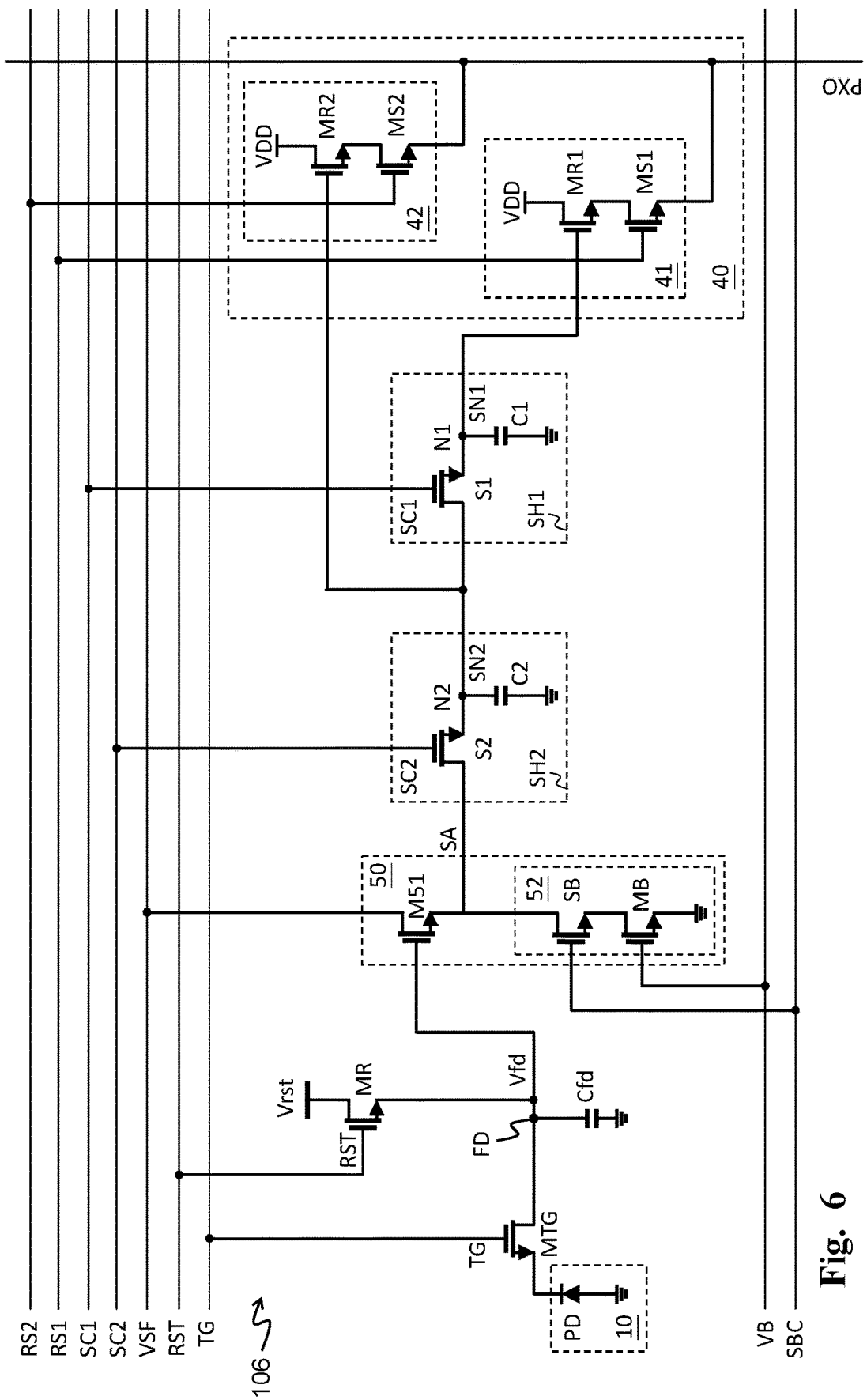
FIG. 6 shows a more specific schematic diagram of an embodiment of the pixel circuit according to the present invention.
Figure 7:
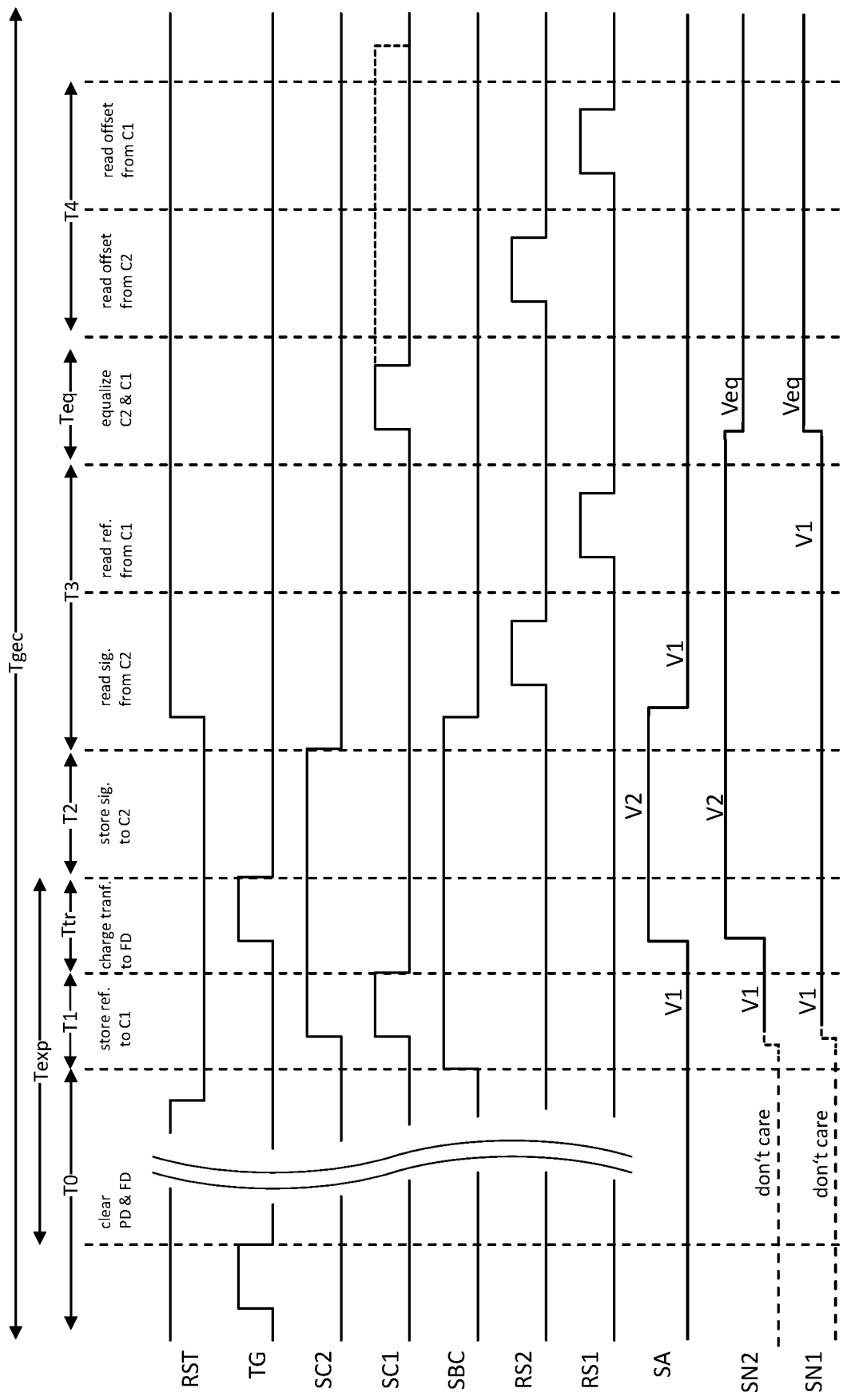
FIG. 7 shows exemplary operation waveforms corresponding to the embodiment of FIG. 6.

FIG. 6 shows a more specific schematic diagram of an embodiment of the pixel circuit (pixel circuit 106) according to the present invention. FIG. 7 shows exemplary operation waveforms corresponding to the embodiment of FIG. 6. As shown in FIG. 6, in one embodiment, the buffer amplifier 50 further includes a current source 52 connected to the source of the sense buffer transistor M51. In this embodiment, the current source 52 can pull down the source of the sense buffer transistor M51, so that when the voltage Vfd on the floating diffusion node FD (also the gate of the buffer transistor M51) changes to a lower level, the buffered output signal SA (i.e. the source of sense buffer transistor M51) can still effectively reflect the change of the voltage Vfd on the floating diffusion node FD, instead of requiring a pulling low process at the drain (i.e. buffer supply signal VSF) of the buffer transistor M51 as described earlier in FIG. 3 and FIG. 5. As shown in FIG. 6 and FIG. 7, in this embodiment, the drain (i.e. buffer supply signal VSF) of the buffer transistor M51 can be supplied with a fixed supply voltage VDD.

Still referring to FIG. 6 and FIG. 7, in one embodiment, the current source 52 includes a biasing transistor MB which is biased by a biasing voltage VB and is configured to operably provide a bias current for the sense buffer transistor M51. In one embodiment, the current source 52 further includes a biasing control switch SB which can turnoff the bias current for saving power, for example when outside the time periods T1, Ttr and T2 as shown in FIG. 7. The biasing control switch SB is controlled by the control signal SBC.

Figure 8:
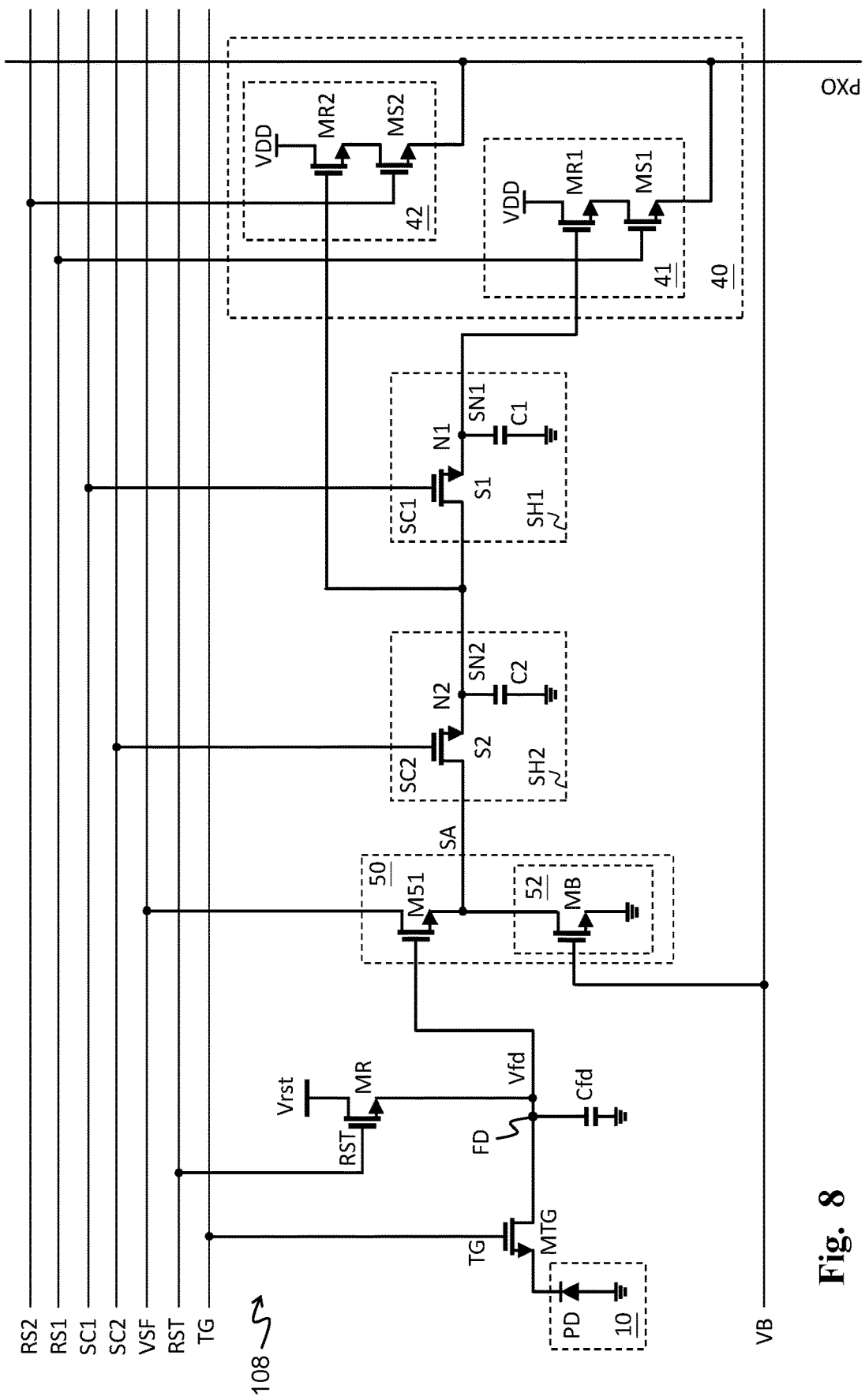
FIG. 8 shows a schematic diagram of one embodiment of the pixel circuit according to the present invention.
Figure 9:
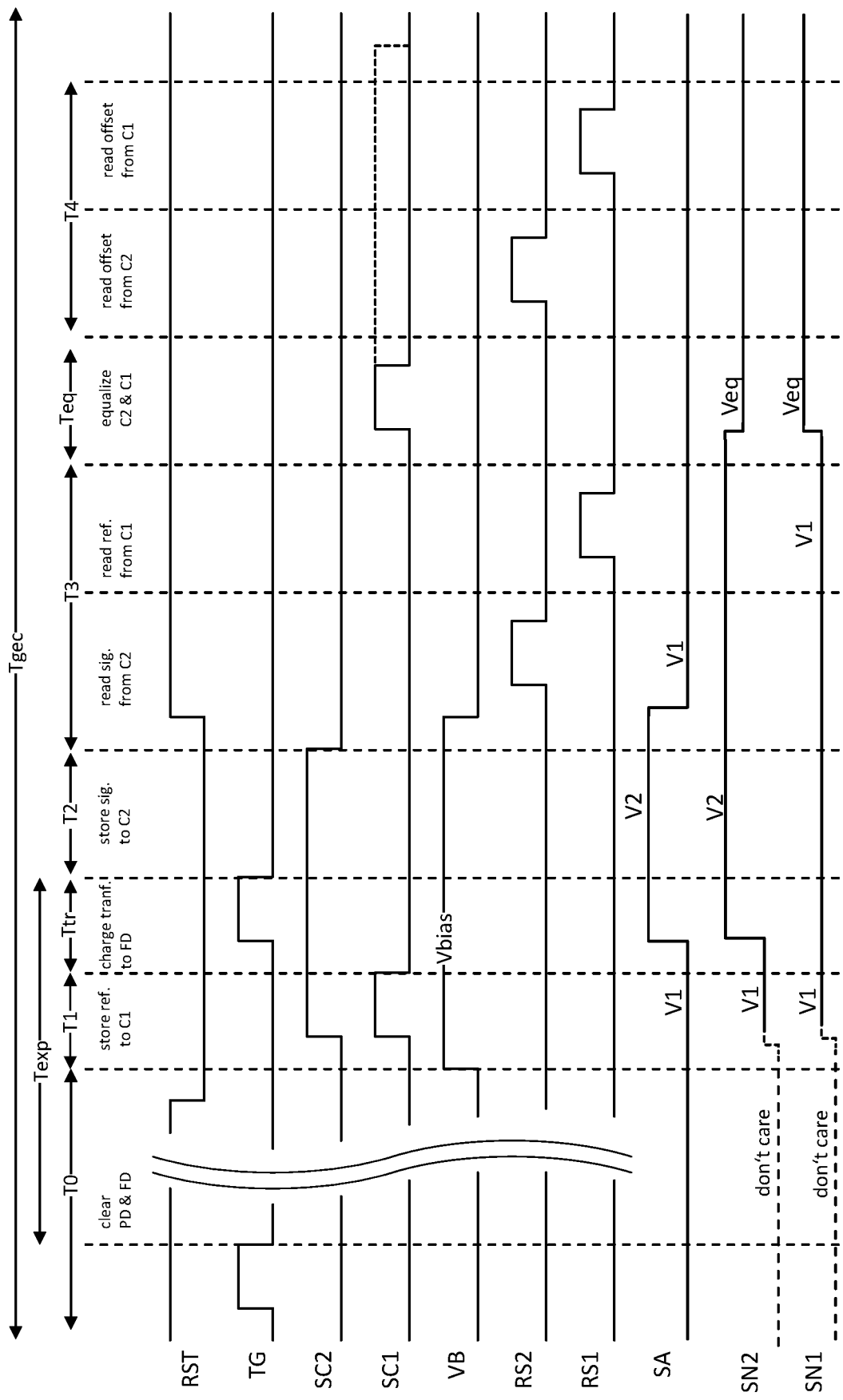
FIG. 9 shows operation waveforms corresponding to the embodiment of FIG. 8.

FIG. 8 shows a schematic diagram of one embodiment of the pixel circuit (pixel circuit 108) according to the present invention. FIG. 9 shows operation waveforms corresponding to the embodiment of FIG. 8. The pixel circuit 108 is similar to the pixel circuit 106 shown in FIG. 6, and differs in that the biasing control switch is omitted compared to the pixel circuit 106. In this embodiment, the bias current is provided when the biasing voltage VB is controlled to be at Vbias during the time periods T1, Ttr and T2, and the bias current can be controlled off for saving power for example when outside the time periods T1, Ttr and T2 by controlling the biasing voltage VB to a low level, as shown in FIG. 9.

Figure 10:
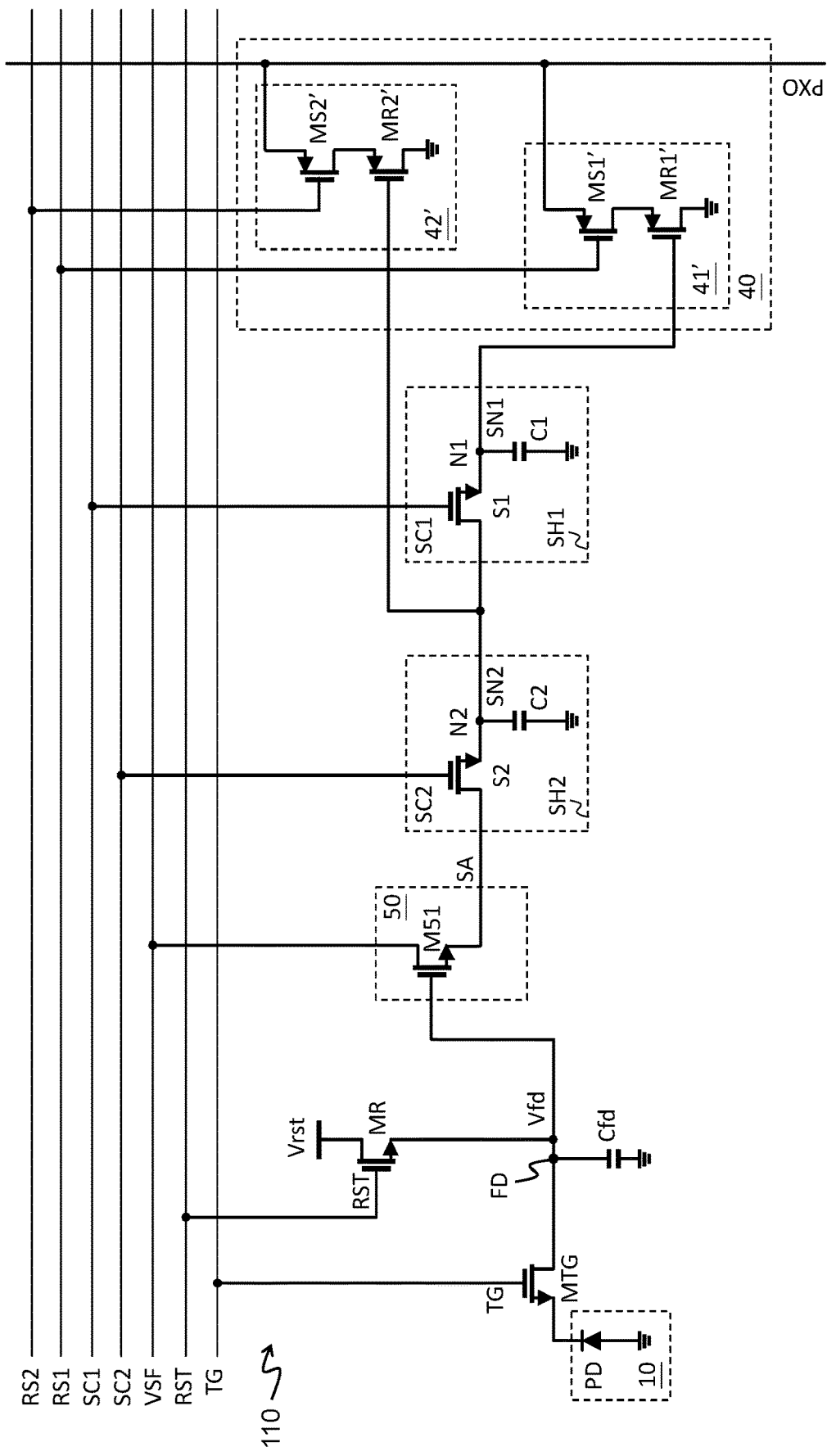
FIG. 10 shows a schematic diagram of one embodiment of the pixel circuit according to the present invention.
Figure 11:
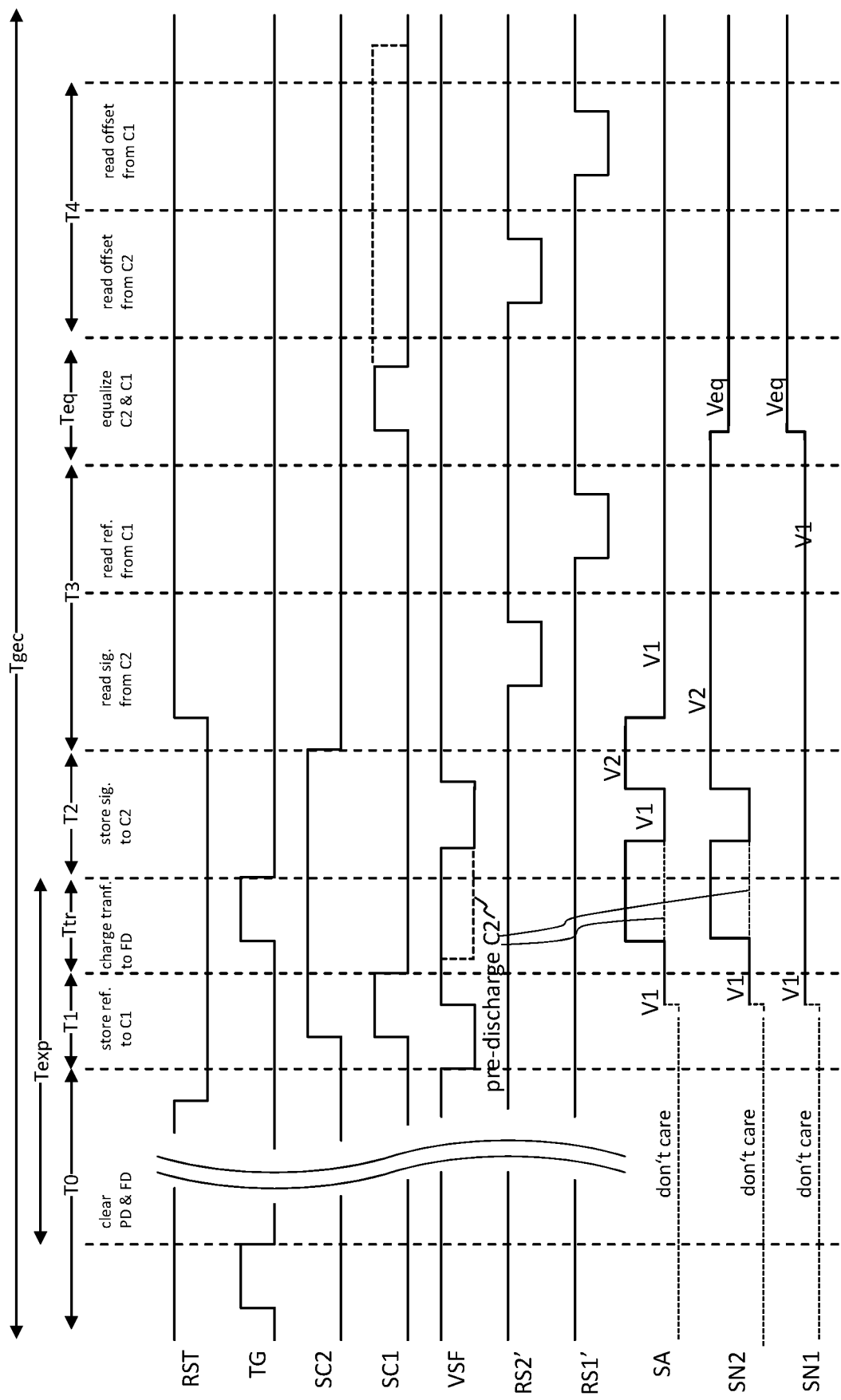
FIG. 11 shows operation waveforms corresponding to the embodiment of FIG. 10.

FIG. 10 shows a schematic diagram of one embodiment of the pixel circuit (pixel circuit 110) according to the present invention. FIG. 11 shows exemplary operation waveforms corresponding to the embodiment of FIG. 10. The pixel circuit shown in FIG. 10 is similar to the one shown in FIG. 5, and differs in that the sense buffer transistor M51 and the first read buffer transistor MR1' are formed in complementary conductive types, and the sense buffer transistor M51 and the second read buffer transistor MR2' are formed in complementary conductive types, so that a level offset of the sense buffer transistor M51 and a level offset of the of the first read buffer transistor MR1' cancel out, and a level offset of the sense buffer transistor M51 and a level offset of the of the second read buffer transistor MR2' cancel out. As a non-limiting example, in this embodiment as shown in FIG. 10, the sense buffer transistor M51 is an NMOS transistor and both the read buffer transistor MR1' and the read buffer transistor MR2' are PMOS transistors. The gate-to-source voltage (VGS) of the sense buffer transistor M51 cancels out the VGS (gate-drain voltage) of the read buffer transistor MR1' and the VGS of the read buffer transistor MR2'. Also note that in this embodiment, the offset levels correspond to the VGS of each of the aforementioned transistors M51, MR1' and MR2'.

Note that in this embodiment shown in FIG. 10, though both the read buffer transistor MR1' and the read buffer transistor MR2' have a conductive type complementary to the sense buffer transistor M51, it is not for limiting the scope of the present invention. At least one of the read buffer transistor MR1' and the read buffer transistor MR2' has a conductive type complementary to the sense buffer transistor M51 should also be considered within the scope of the present invention.

Also note that, as shown in FIG. 10, the read switch MS1' and the read switch MS2' are also configured as PMOS transistors accordingly. In this embodiment, as shown in FIG. 11, the corresponding control signals RS1' and RS2' are pulsed low for example in T3 and T4, which are in inversed phase from FIG. 3, when the S/H signal SN1 or the S/H signal SN2 is sensed by the corresponding first read amplifier 41' or the second read amplifier 42'.

As shown in FIG. 5, 6, 8 or 10, in one embodiment, the output of the first read amplifier 41 (41' also) and the output of the second read amplifier 42 (42' also) are shorted and connected to the pixel line PXO. In other words, in this embodiment, the first read amplifier 41 and the second read amplifier 42 share a same pixel line PXO.

Figure 12:
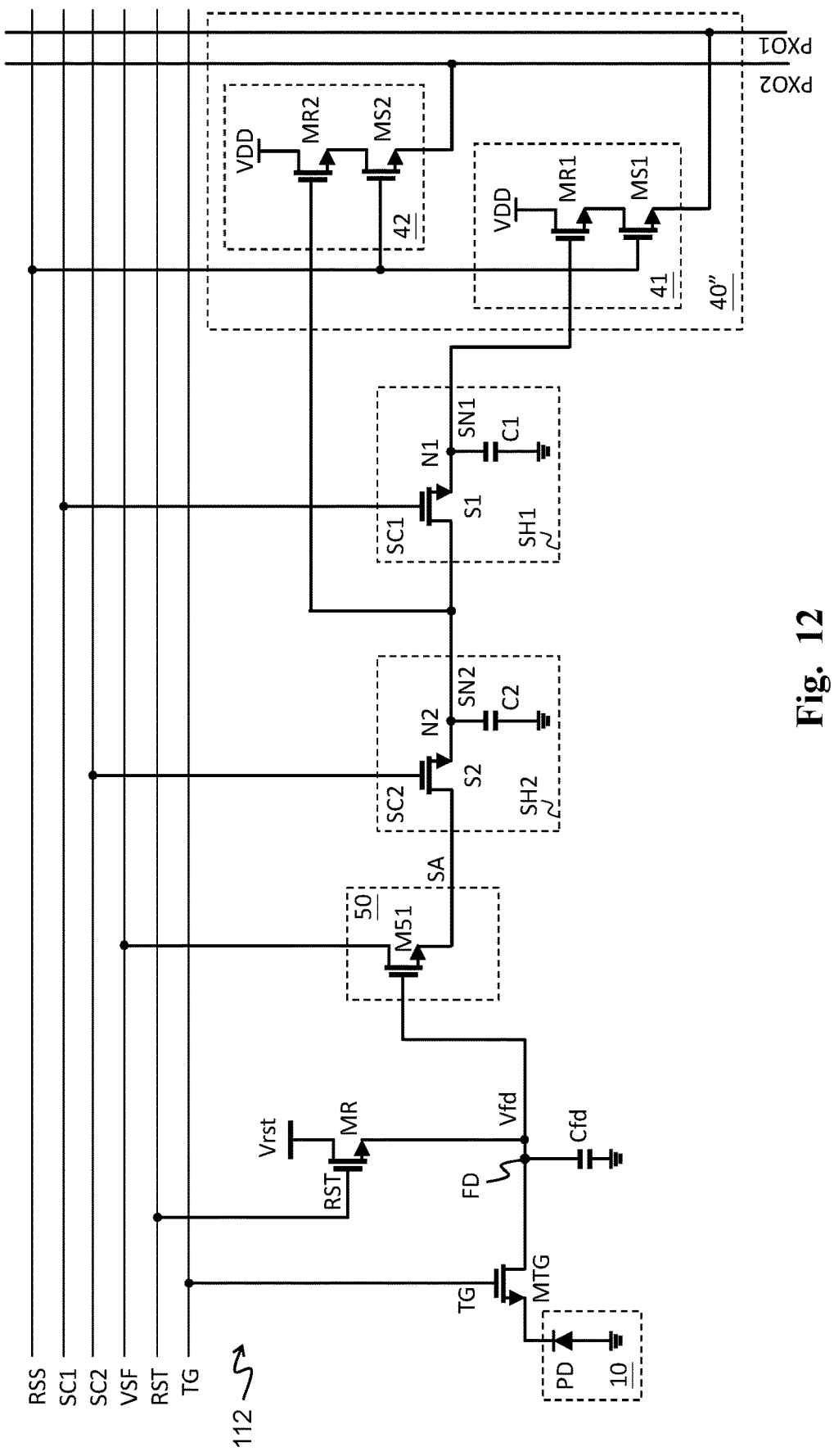
FIG. 12 shows a schematic diagram of one embodiment of the pixel circuit according to the present invention.
Figure 13:
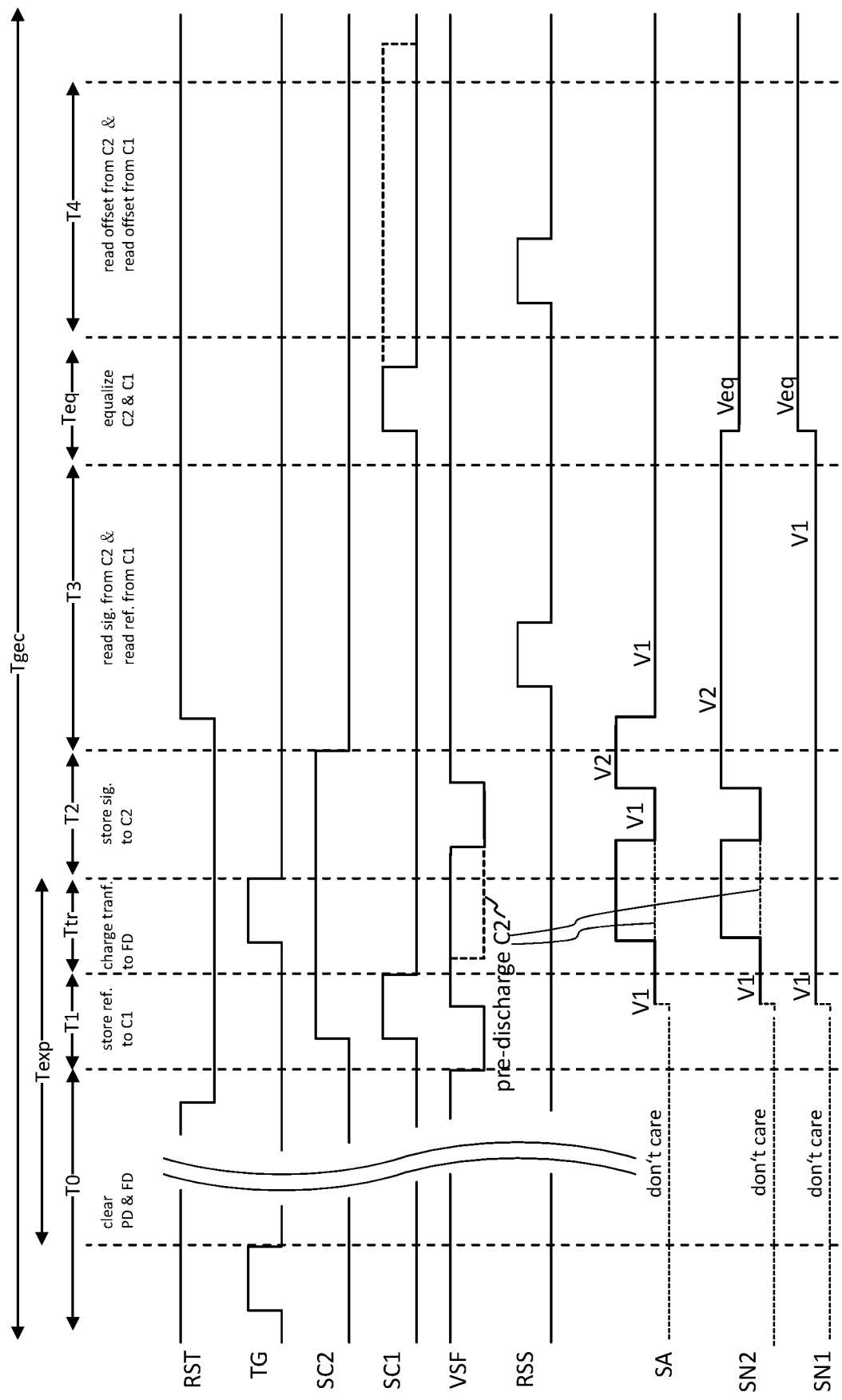
FIG. 13 shows operation waveforms corresponding to the embodiment of FIG. 12.

FIG. 12 shows a schematic diagram of one embodiment of the pixel circuit (pixel circuit 112) according to the present invention. FIG. 13 shows exemplary operation waveforms corresponding to the embodiment of FIG. 12. The pixel circuit 112 shown in FIG. 12 is similar to the one shown in FIG. 5, and differs in that the output of the first read amplifier 41 is connected to a first pixel line PXO1, and the output of the second read amplifier 42 is connected to a second pixel line PXO2. In other words, in this embodiment, the read amplifiers are read out by different pixel lines.

In one embodiment, as shown in FIG. 12 and FIG. 13, both the read switch MS1 and the read switch MS2 of the amplifier circuit 40" are controlled by one single control signal RSS which is also pulsed high during for example time periods T3 and T4.

Figure 14:
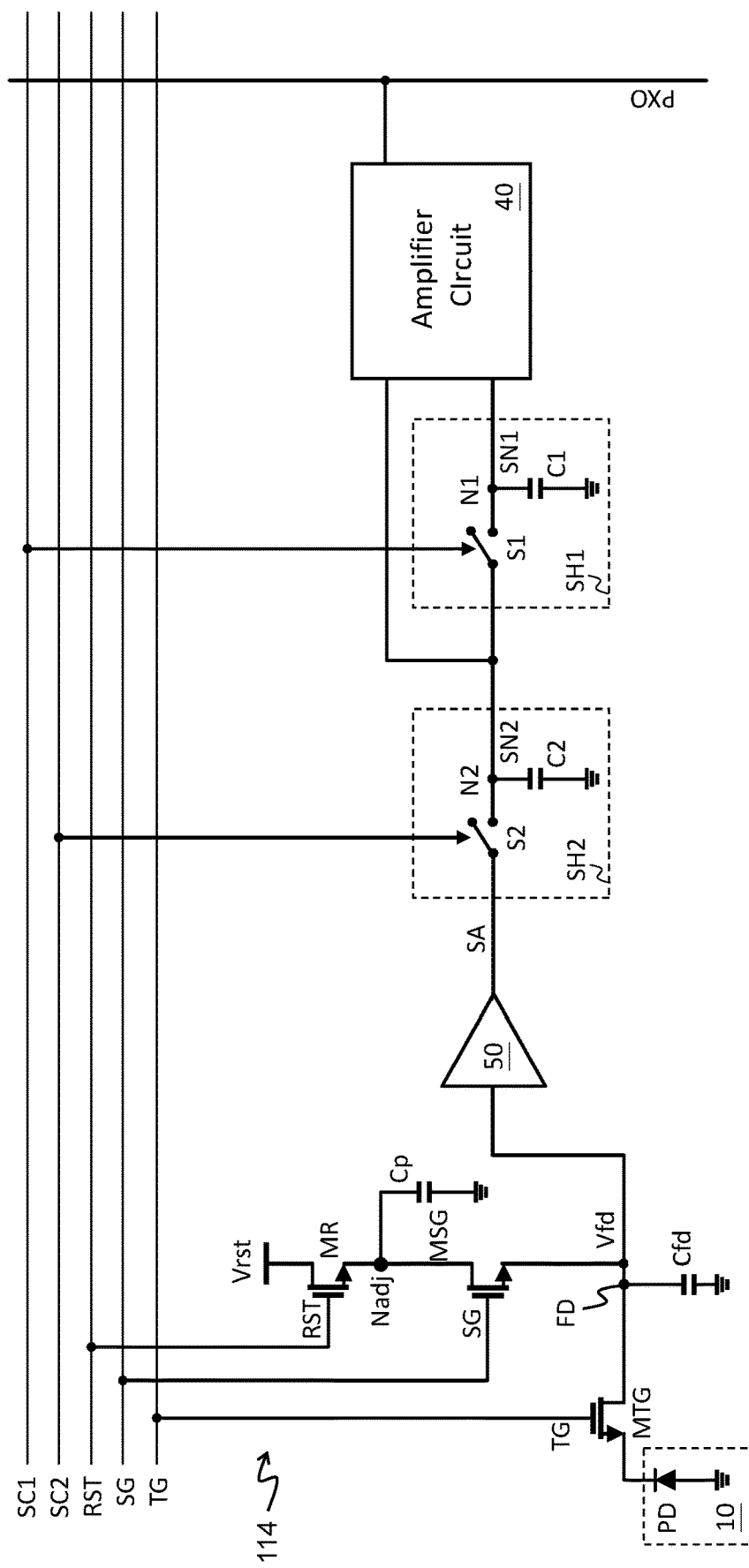
FIG. 14 shows a schematic diagram of one embodiment of the pixel circuit according to the present invention.

FIG. 14 shows a schematic diagram of one embodiment of the pixel circuit according to the present invention (pixel circuit 114). The pixel circuit shown in FIG. 14 is similar to the pixel circuit 102 shown in FIG. 2, and differs in that a capacitance on the floating diffusion node FD is adjustable by an adjusting signal SG such that the pixel circuit 114 can operate in at least one of the following modes:

(1) In a low conversion gain mode, the floating diffusion node FD has a first equivalent capacitance. (2) In a high conversion gain mode, the floating diffusion node FD has a second equivalent capacitance which is smaller than the first equivalent capacitance, and/or (3) in an HDR (High Dynamic Range) mode, the floating diffusion node FD switches between the first equivalent capacitance and the second equivalent capacitance.

Since the first equivalent capacitance is larger than the second equivalent capacitance, the change of the voltage Vfd on the floating diffusion node FD having the first equivalent capacitance according to a change in charge is lower (i.e. lower conversion gain) compared to that having the second equivalent capacitance (i.e. higher conversion gain) with the same level of charge transferred from the photo diode PD.

Note that when in the HDR mode, switching between the different equivalent capacitances can establish a non-linear conversion gain curve to achieve HDR, which those in the art can derive from the teaching of the present invention.

Still referring to FIG. 14, in one specific embodiment, the pixel circuit 114 differs from the pixel circuit 102 shown in FIG. 2 in that the pixel circuit 114 further comprises an adjusting switch MSG and an adjusting capacitor Cp, such that the floating diffusion node FD has the first equivalent capacitance (Cfd plus Cp) or the second equivalent capacitance (Cfd), so as to achieve the aforementioned different modes.

More specifically, as shown in FIG. 14, the adjusting switch MSG is connected between the reset transistor MR and the floating diffusion node FD and controlled by the adjusting signal SG. The adjusting capacitor Cp is connected to a joint node Nadj of the reset transistor MR and the adjusting switch MSG. When the adjusting switch MSG is ON, the floating diffusion node FD has an equivalent capacitance of the sum of the capacitance Cfd of the floating diffusion and the capacitance of the adjusting capacitor Cp, which corresponds to the first equivalent capacitance. When the adjusting switch MSG is OFF, the floating diffusion node FD has an equivalent capacitance of the capacitance Cfd of the floating diffusion only, which corresponds to the second equivalent capacitance, and is smaller than the first equivalent capacitance as mentioned.

Figure 15:
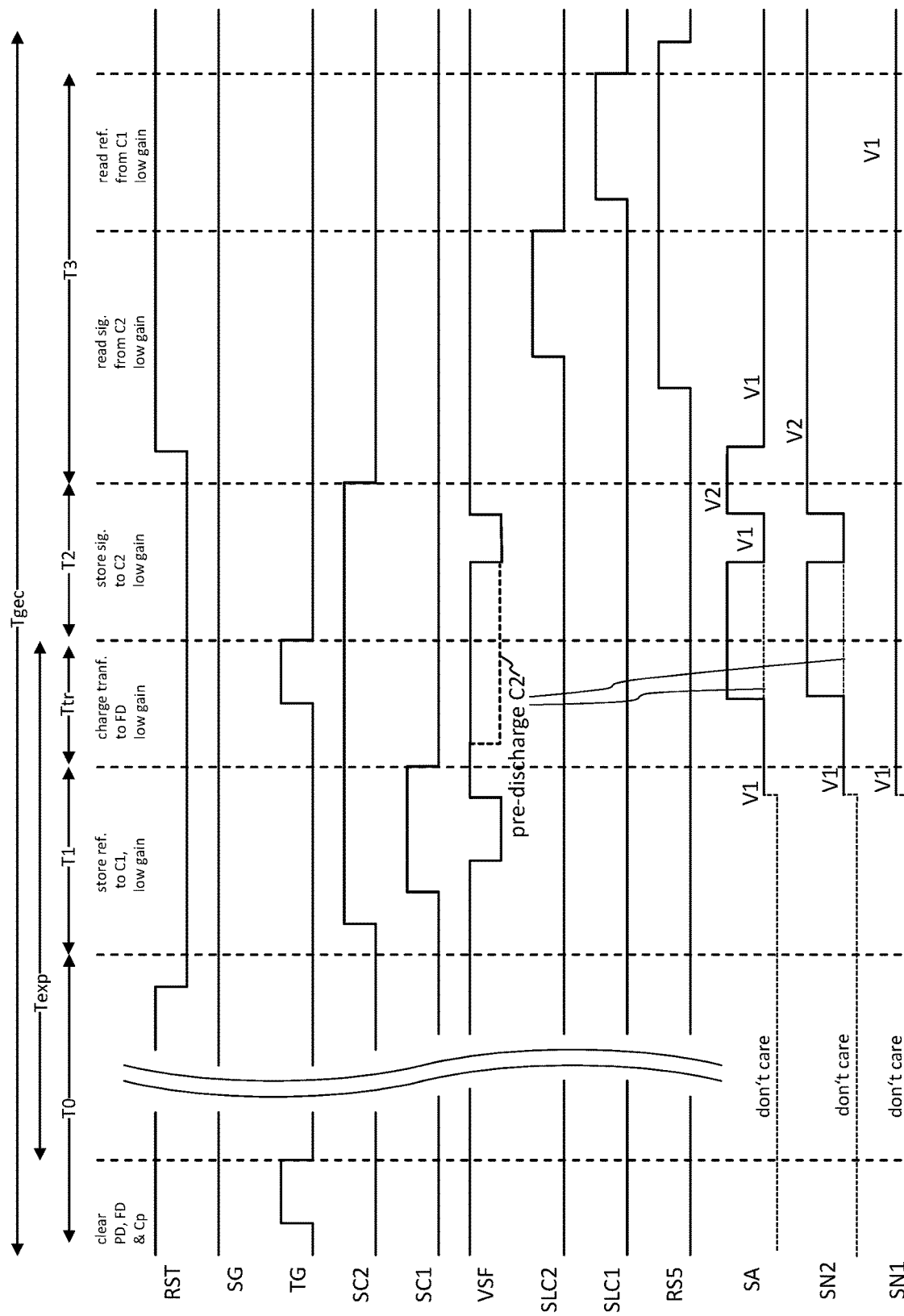
FIG. 15-FIG. 17 show operation waveforms corresponding to the embodiment of FIG. 14.

FIG. 15 shows operation waveforms corresponding to the embodiment of FIG. 14 and other embodiments according to the present invention. As shown in FIG. 15, in the low conversion gain mode, the adjusting switch MSG is always ON (i.e. higher equivalent capacitance), and a low-gain calibrated signal is generated according to the first output signal and the second output signal (e.g. during T3 or after). Note that in the low conversion gain mode, the first output signal and the second output signal are obtained similar to the previous embodiments as described. More specifically, in the first state (i.e. the reset state), charge on the floating diffusion node FD is fully dissipated by pulsing the reset transistor MR in T0 as shown in FIG. 15, and in the second state (i.e. the sensing state), charge of the photo-sensitive element 10 after an exposure time period Texp is fully transferred to the floating diffusion node FD by pulsing the transfer gate MTG in Ttr as shown in FIG. 15. From one perspective, in the reset state, the first output signal corresponds to a reference signal which reflects the reset state on the floating diffusion node FD, and in the sensing state, the second output signal corresponds to a sensed signal which reflects the voltage Vfd on the floating diffusion node FD after an exposure of the photo-sensitive element 10 and charge being transferred to the floating diffusion node FD, under the low conversion gain mode. Note that the low conversion gain mode is also referred to as high saturation mode.

Figure 16:
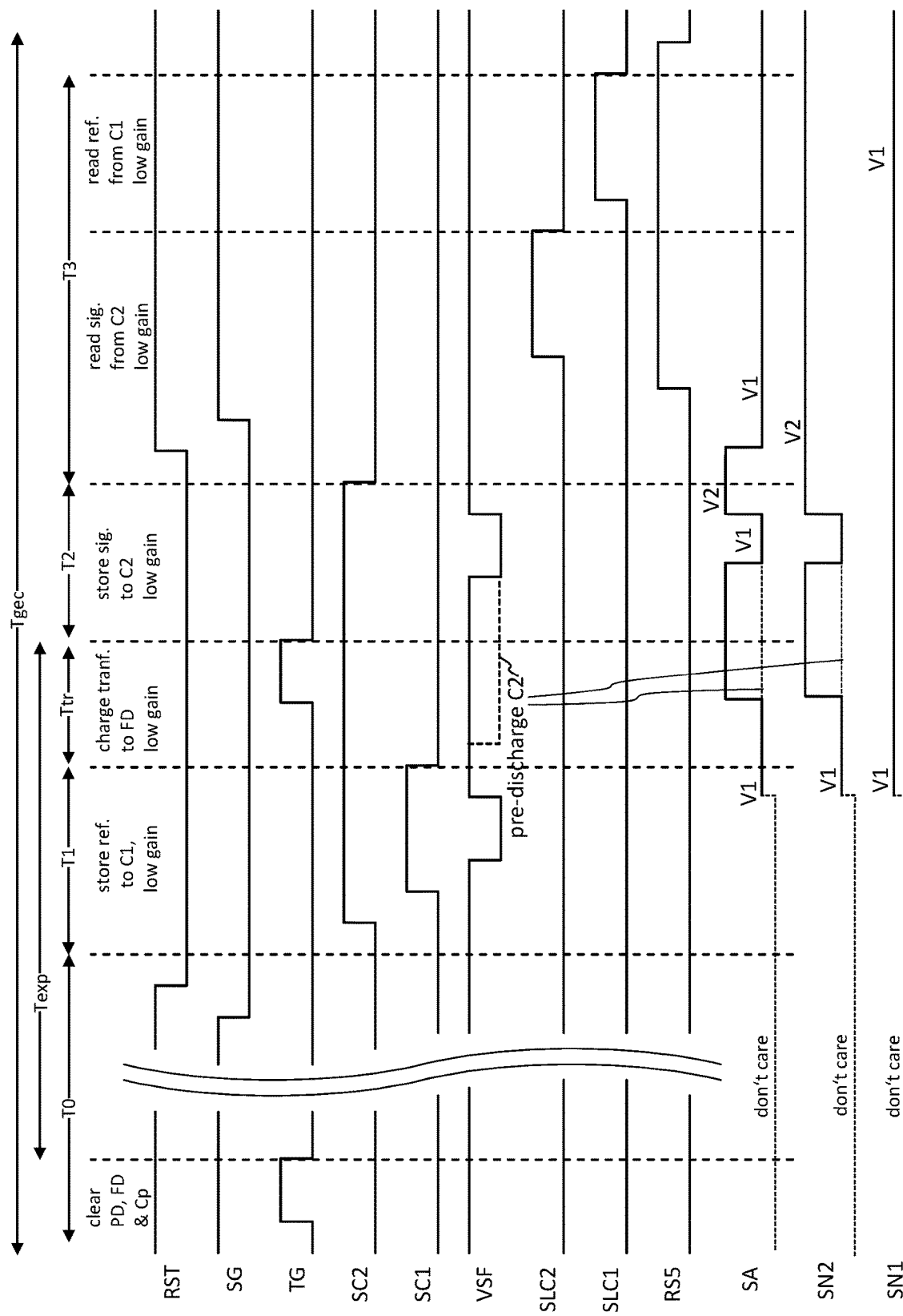

FIG. 16 shows operation waveforms corresponding to for example the embodiment of FIG. 14 according to the present invention. As shown in FIG. 15, in the high conversion gain mode, when the S/H stage SH1 and the S/H stage SH2 sample and hold the first voltage V1 and the second V2 corresponding to the first state and the second state respectively, the adjusting switch MSG is OFF (i.e. lower equivalent capacitance during T1, Ttr and T2), and a high-gain calibrated signal is generated according to the first output signal and the second output signal (e.g. during T3 or after). Note that in the high conversion gain mode, the first output signal and the second output signal are obtained similar to the previous embodiments as described. More specifically, in the first state (i.e. the reset state), charge on the floating diffusion node FD is fully dissipated by pulsing the reset transistor MR in T0 as shown in FIG. 16, and in the second state (i.e. the sensing state), charge of the photo-sensitive element 10 after an exposure time period Texp is fully transferred to the floating diffusion node FD by pulsing the transfer gate MTG in Ttr as shown in FIG. 16. From one perspective, in the reset state, the first output signal corresponds to a reference signal which reflects the reset state on the floating diffusion node FD, and in the sensing state, the second output signal corresponds to a sensed signal which reflects the voltage Vfd on the floating diffusion node FD after an exposure of the photo-sensitive element 10 and charge being transferred to the floating diffusion node FD, under the high conversion gain mode. Note that the low conversion gain mode is also referred to as high sensitivity mode.

Figure 17:
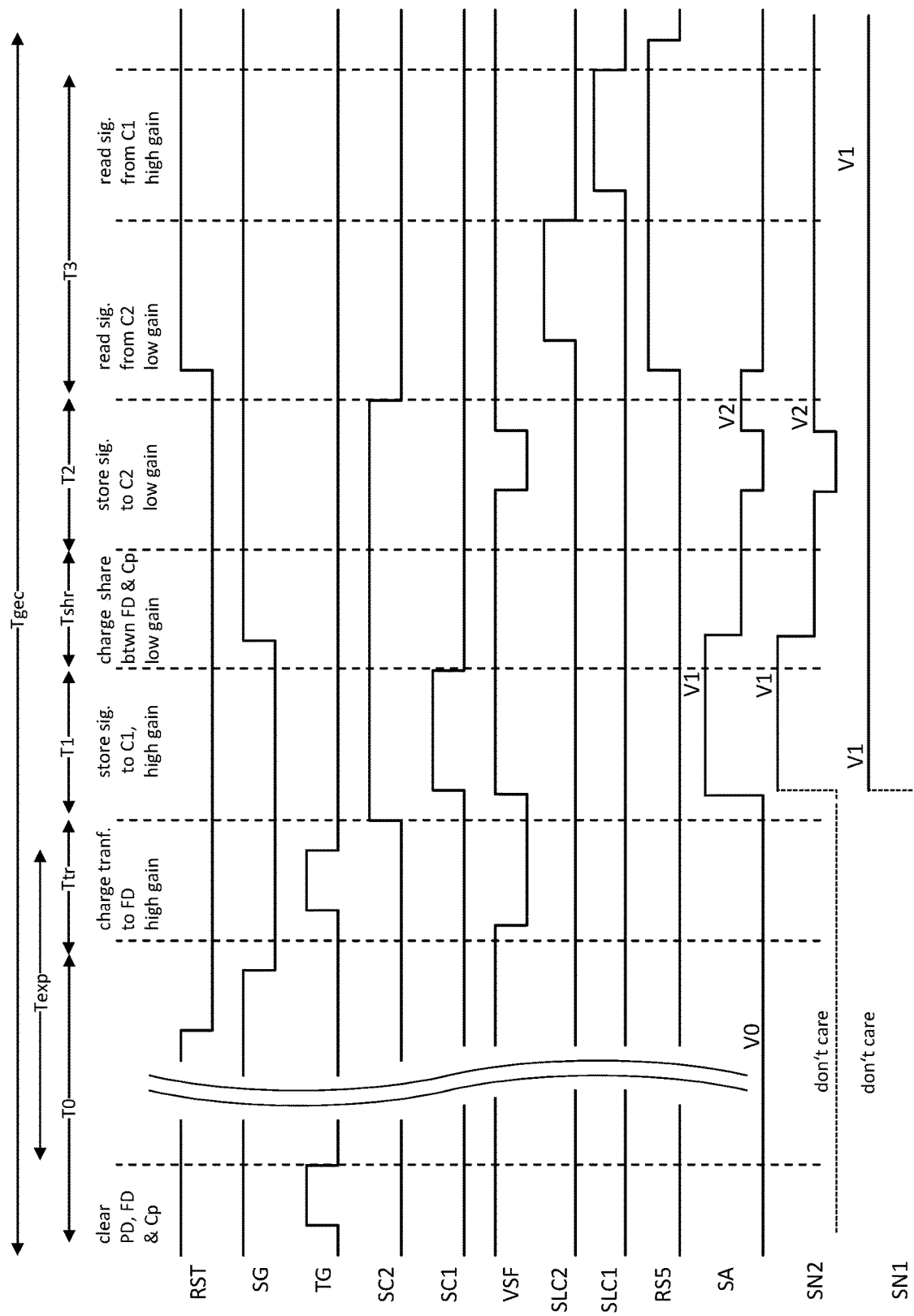

FIG. 17 shows operation waveforms corresponding to for example the embodiment of FIG. 14 according to the present invention. Referring to FIG. 14 and FIG. 17, as described earlier, in the HDR mode, the floating diffusion node FD switches between the first equivalent capacitance and the second equivalent capacitance to achieve HDR. More specifically, under the HDR mode, firstly, after the reset state during T0, the pixel circuit 114 operates in a sensing state in a high conversion gain sub-mode, wherein the adjusting switch MSG is OFF, and charge of the photo-sensitive element 10 after an exposure time period Texp is fully transferred to the floating diffusion node FD having the second equivalent capacitance (lower) by pulsing the transfer gate MTG in Ttr as shown in FIG. 17, so as to generate the first output signal corresponding to a sensed signal in the high conversion gain sub-mode.

Secondly, the pixel circuit 114 operates in a sensing state in a low conversion gain sub-mode, wherein the adjusting switch MSG is ON and charge of the floating diffusion node FD (after the time period Texp and T1) is redistributed (i.e. charge shared or equalized) according to the first equivalent capacitance (i.e. from Cfd to Cfd plus Cp) in Tshr as shown in FIG. 17, so as to generate the second output signal corresponding to the sensed signal in the low conversion gain sub-mode. In the HDR mode, an HDR signal is generated according to the first output signal and the second output signal.

In this embodiment as shown in FIG. 17, the first output signal and the second signal correspond to a sensed signal in response to a same exposure under the high conversion gain sub-mode and the low conversion gain sub-mode respectively.

Figure 18:
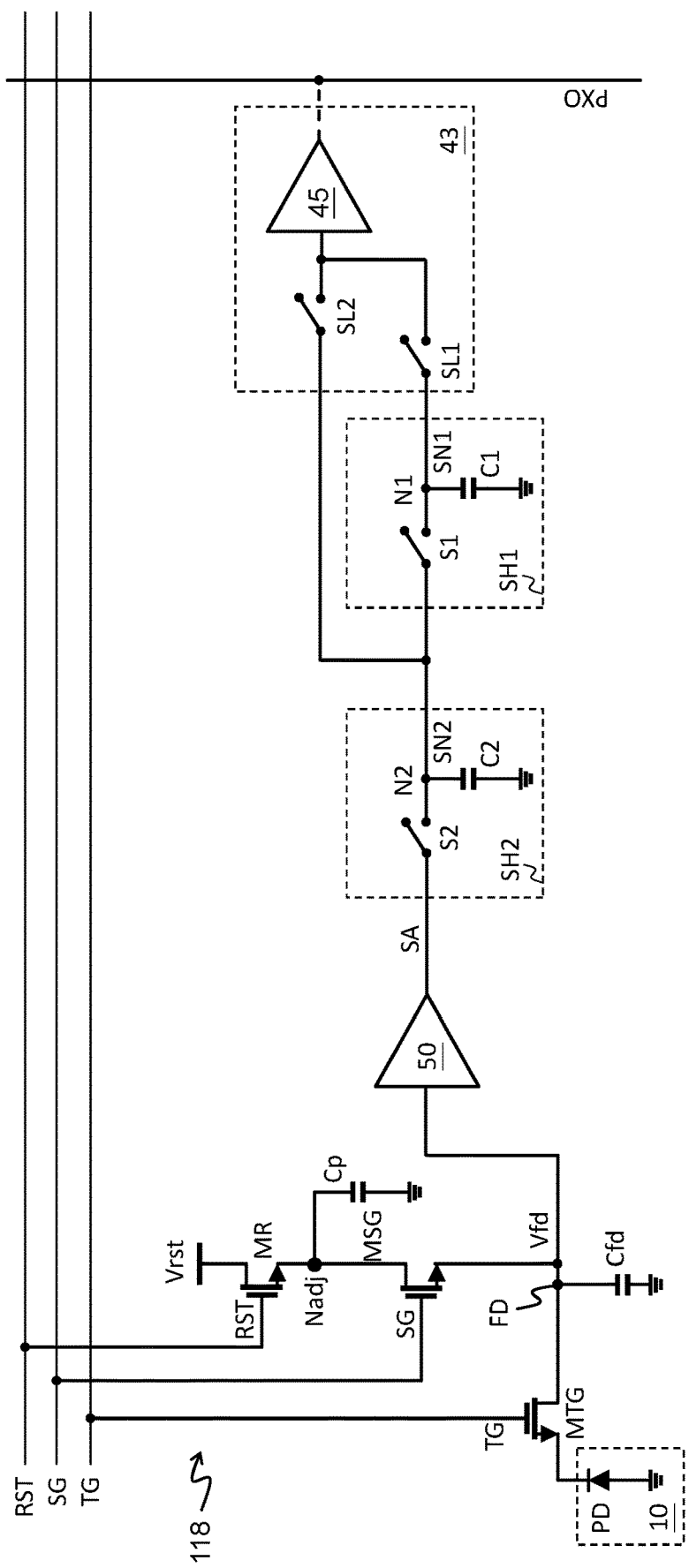
FIG. 18 shows a more specific schematic diagram of an embodiment of the pixel circuit according to the present invention.

FIG. 18 shows a more specific schematic diagram of an embodiment of the pixel circuit (pixel circuit 118) according to the present invention. In one embodiment, the amplifier circuit 43 includes a read amplifier 45 and a selector circuit 46. The read amplifier 45 is configured to sense the first S/H signal SN1 or the second S/H signal for generating the first output signal or the second output signal correspondingly.

The selector circuit 46 is configured to operably select one of the output (i.e. S/H signal SN1) of the first S/H stage SH1 or the output (i.e. S/H signal SN2) of the second S/H stage SH2 to be electrically connected to an input of the read amplifier 45 for generating the corresponding first output signal or the corresponding second output signal during the third time period (e.g. T3 in FIG. 15 to FIG. 17).

Figure 19:
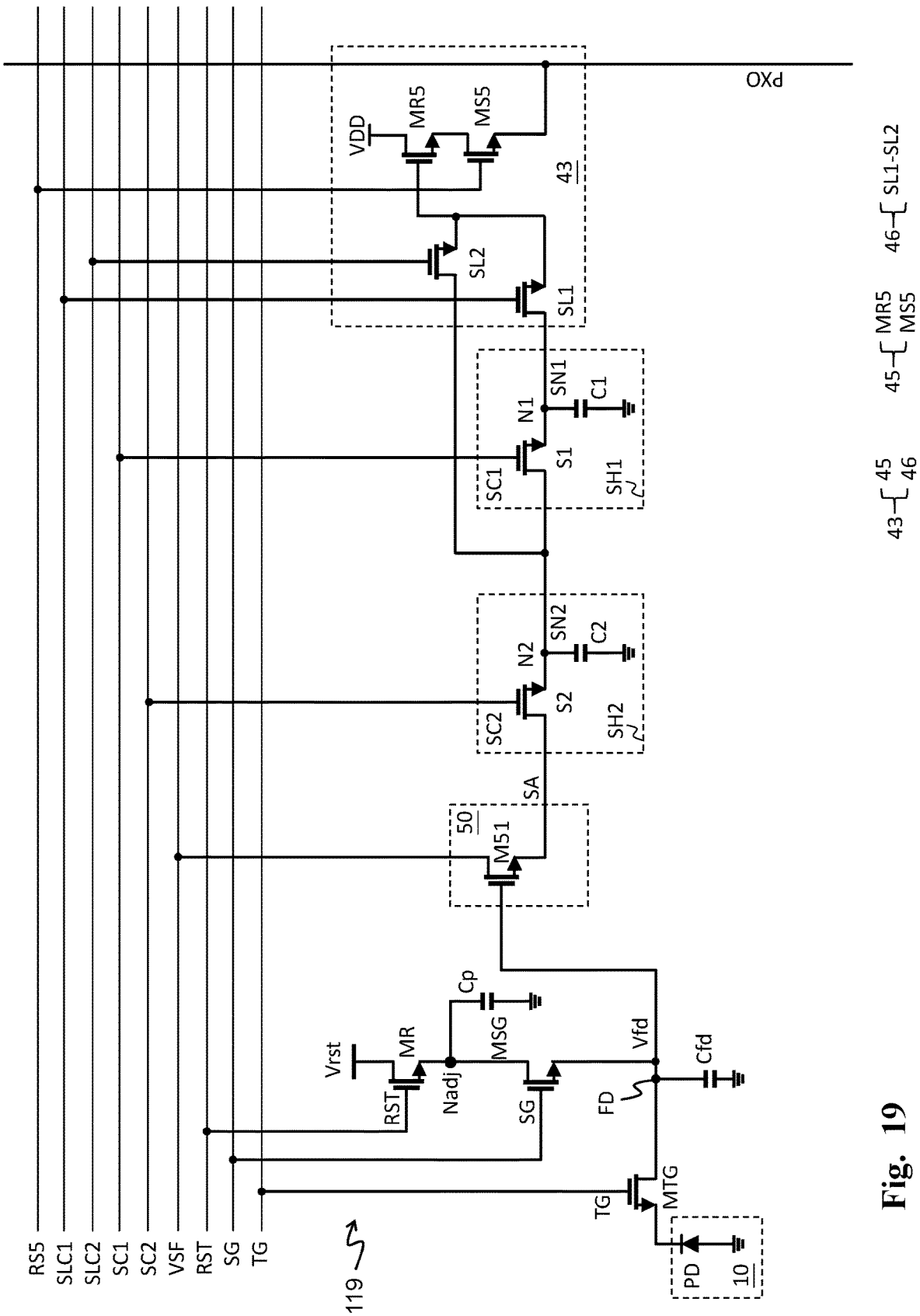
FIG. 19 shows a more detailed schematic diagram of an embodiment of the pixel circuit according to the present invention.

FIG. 19 shows a more detailed schematic diagram of an embodiment of the pixel circuit (pixel circuit 119) according to the present invention. In one embodiment, the read amplifier 45 includes a read buffer transistor MR5 and a read switch MS5. The selector circuit 46 includes selection switches SL1 and SL2. The selection switches SL1 and SL2 select one of the S/H signal SN1 or the S/H signal SN2 to be electrically connected to the gate of the read buffer transistor MR5. The read switch MS5 controls the coupling of the read buffer transistor MR5 and the pixel line PXO. The selection switches SL1 and SL2 are controlled by the selection control signals SLC1 and SLC2. The read switch MS5 is controlled by the control signal RS5.

Referring to FIG. 19 and FIG. 15 to FIG. 17, in one embodiment, the S/H signal SN1 and the S/H signal SN2 are sensed one by one by the read amplifier 45 during T3 in FIG. 15 to FIG. 17.

Figure 20:
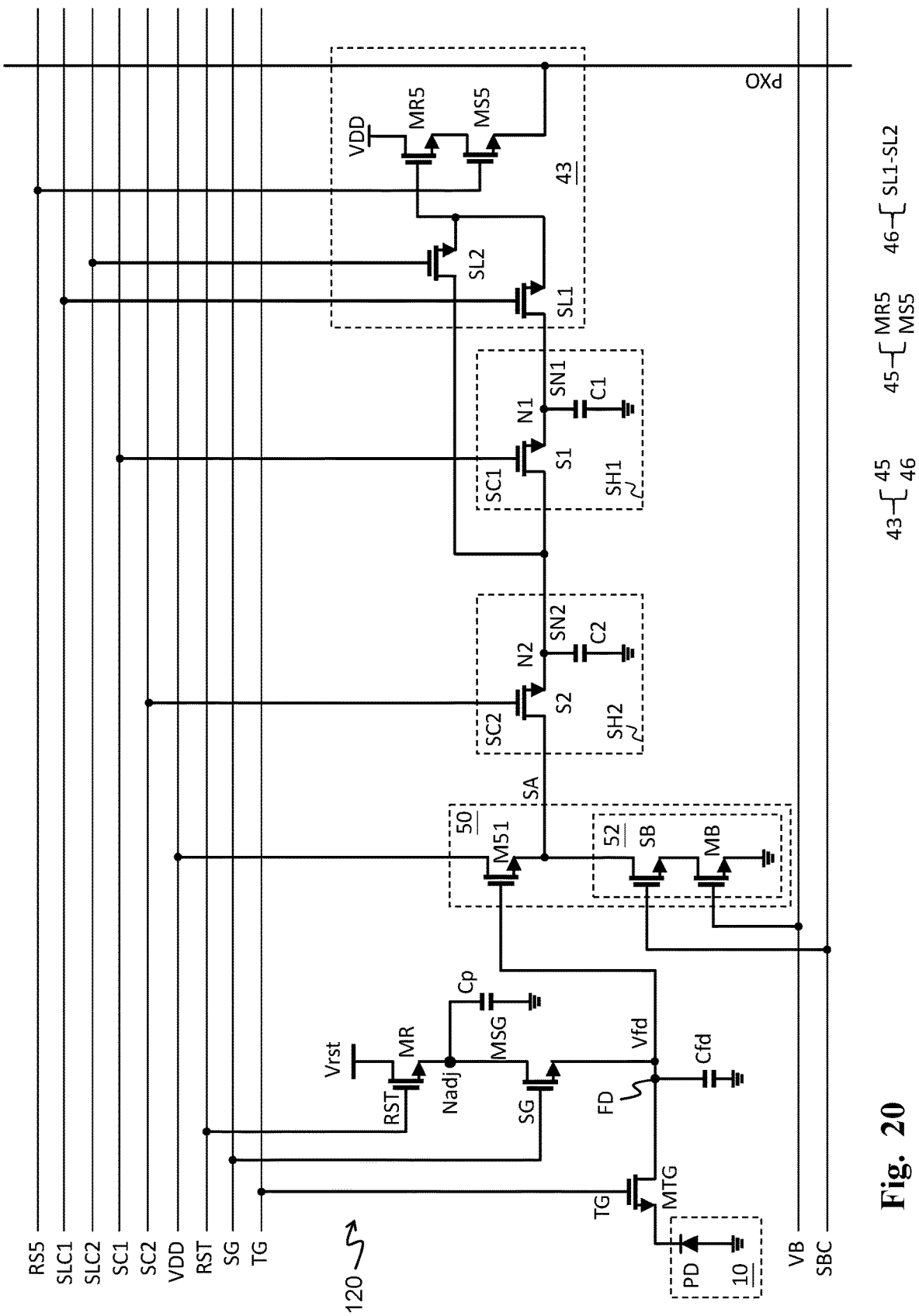
FIG. 20 shows a more specific schematic diagram of an embodiment of the pixel circuit according to the present invention.
Figure 21:
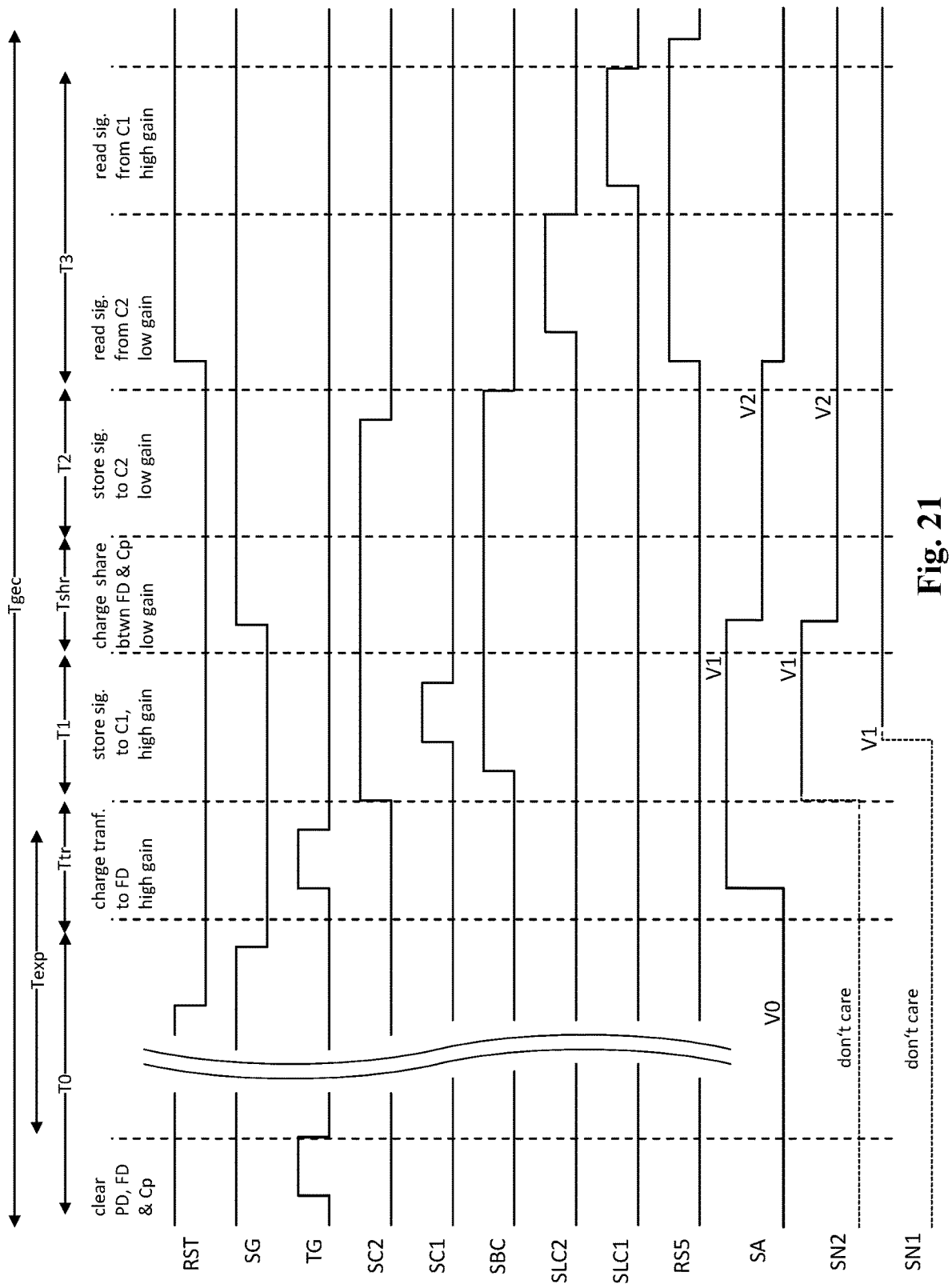
FIG. 21 shows operation waveforms corresponding to the embodiment of FIG. 20.

FIG. 20 shows a more specific schematic diagram of an embodiment of the pixel circuit (pixel circuit 120) according to the present invention. FIG. 21 shows exemplary operation waveforms corresponding to the embodiment of FIG. 20. The pixel circuit 120 is similar to the pixel circuit 119 in FIG. 19, and differs in that the buffer amplifier 50 further includes a current source 52 connected to the source of the sense buffer transistor M51. The configuration and operation of the buffer amplifier 50 having the current source 52 are similar to the embodiment of the pixel circuit 106 in FIG. 6, which is not to be repeated herein.

Figure 22:
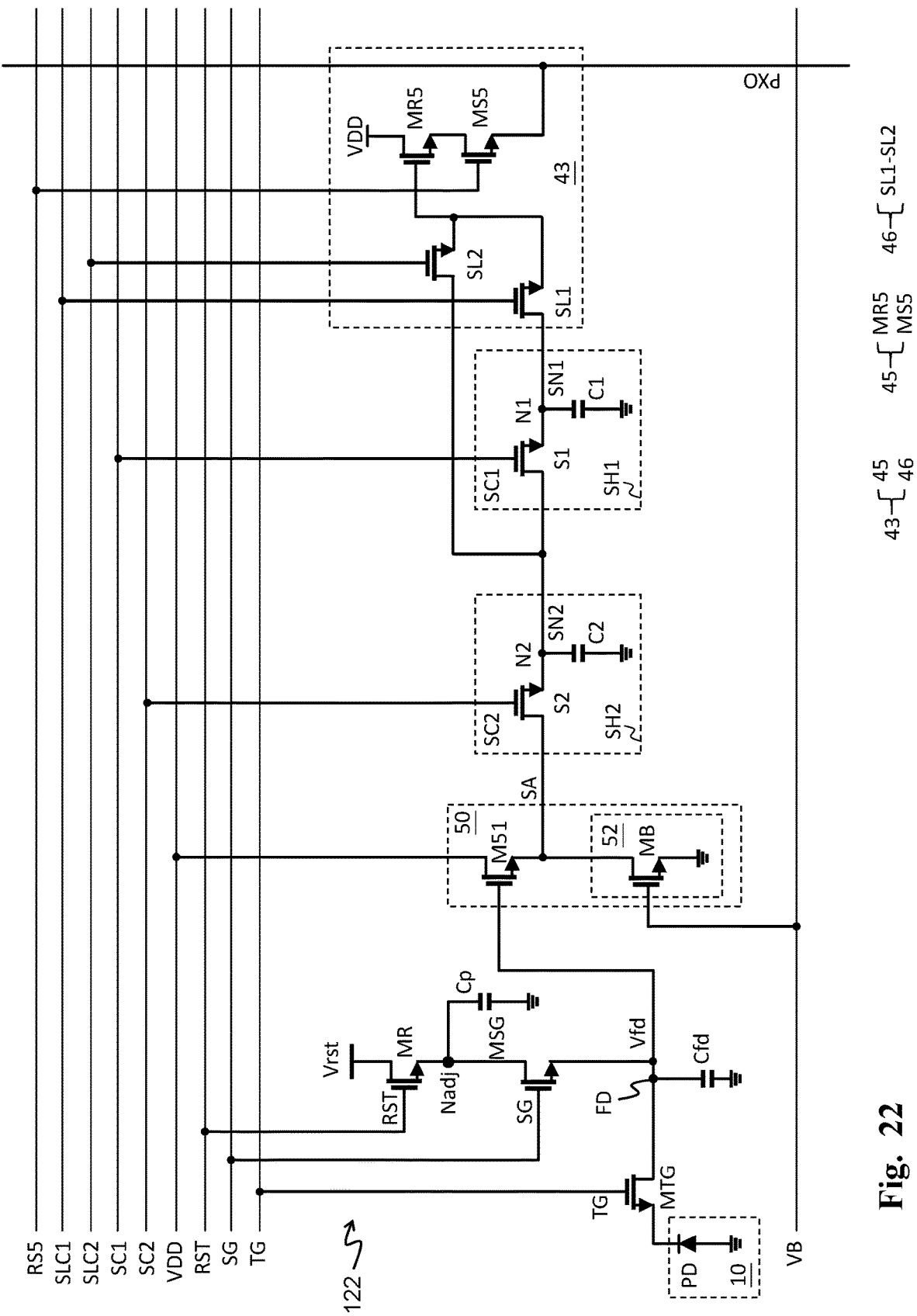
FIG. 22 shows a schematic diagram of one embodiment of the pixel circuit according to the present invention.
Figure 23:
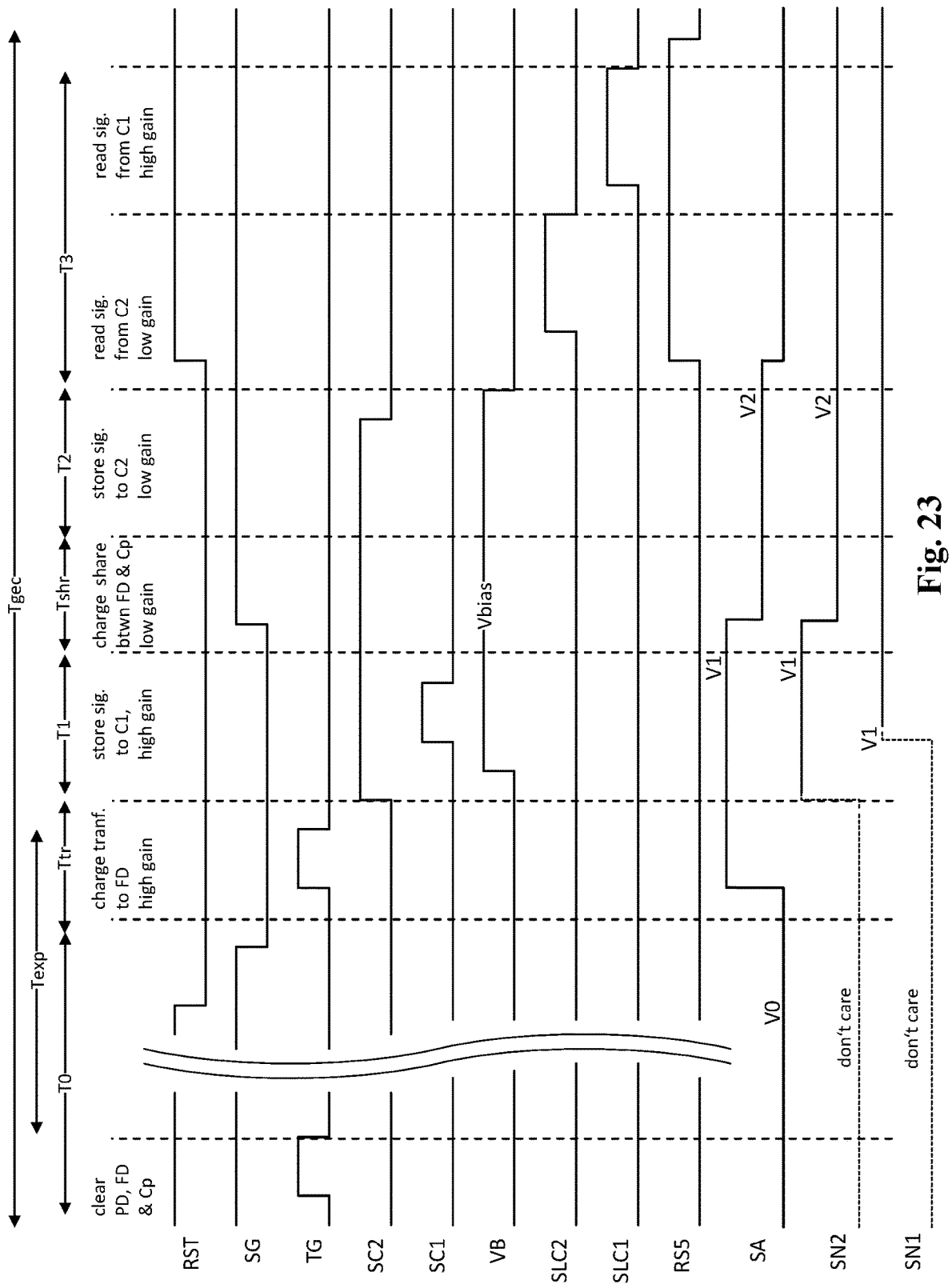
FIG. 23 shows operation waveforms corresponding to the embodiment of FIG. 22.

FIG. 22 shows a schematic diagram of one embodiment of the pixel circuit (pixel circuit 122) according to the present invention. FIG. 23 shows exemplary operation waveforms corresponding to the embodiment of FIG. 22. The pixel circuit 122 shown in FIG. 22 is similar to the pixel circuit 120 shown in FIG. 20, and differs in that the biasing control switch is omitted compared to the pixel circuit 120. In this embodiment, bias current can still be controlled off for saving power for example when outside the time periods T1, Ttr and T2 by controlling the biasing voltage VB to a low level, as shown in FIG. 23.

Figure 24:
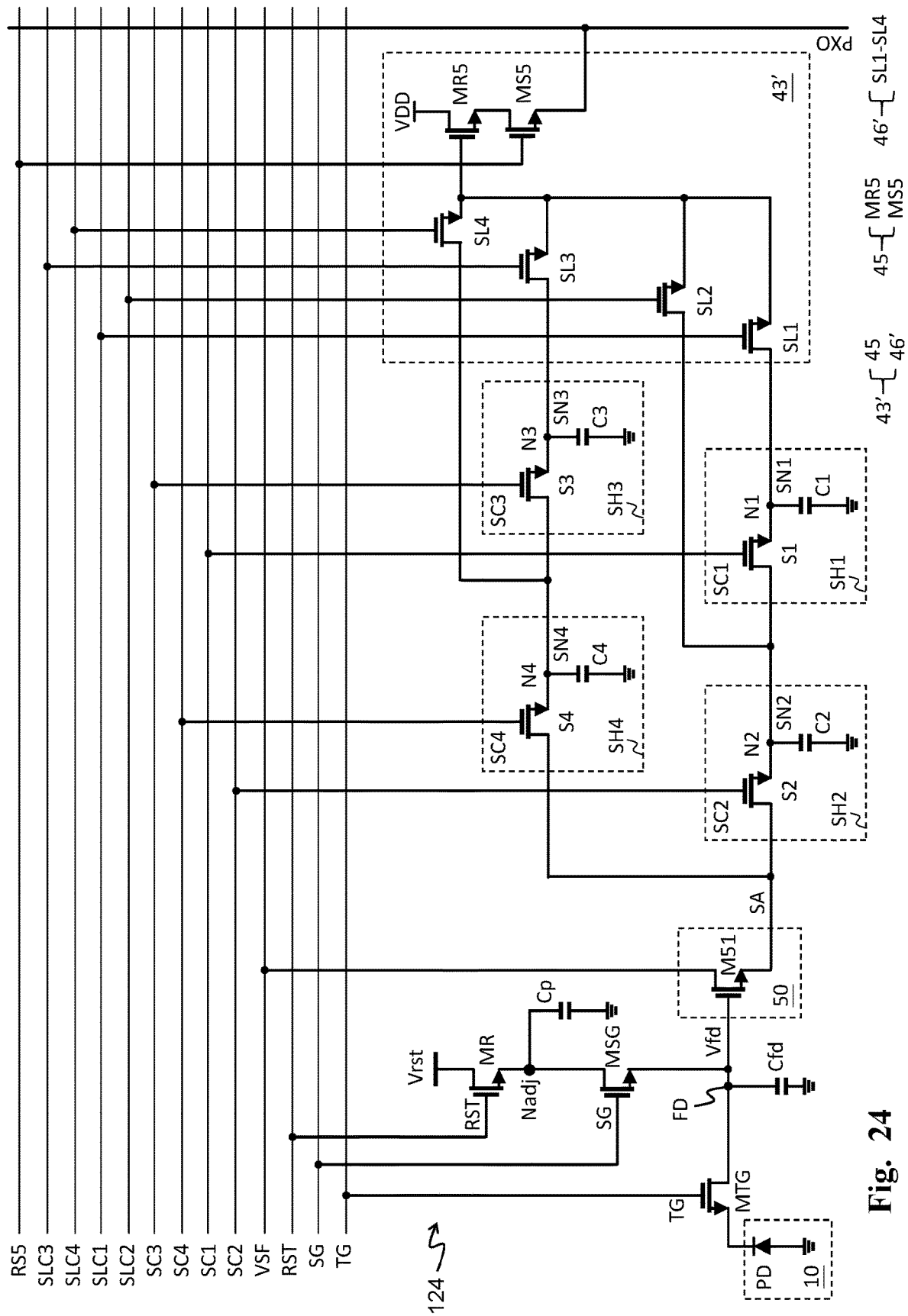
FIG. 24 shows a schematic diagram of one embodiment of the pixel circuit according to the present invention.

FIG. 24 shows a schematic diagram of one embodiment of the pixel circuit (pixel circuit 124) according to the present invention. The pixel circuit 124 shown in FIG. 24 is similar to the pixel circuit 119 shown in FIG. 19, and differs in that the pixel circuit 124 further comprises a third S/H stage SH3 and a fourth S/H stage SH4. The third S/H stage SH3 and the fourth S/H SH4 stage are connected in cascade between the buffer amplifier 50 and the amplifier circuit 40. The fourth S/H stage SH$ is configured to operably sample, or to operably sample and hold the buffered output signal SA to generate a fourth S/H signal SN4, and the third S/H stage SH3 is configured to operably sample and hold the fourth S/H signal SN4 to generate a third S/H signal SN3.

In this embodiment, the amplifier circuit 43' is further electrically connected to the output (i.e. the node N3) of the third S/H stage SH3 and an output (i.e. the node N4) of the fourth S/H stage SH4 independently. More specifically, the amplifier circuit 43' can further sense the S/H signal SN3 irrelevant to the charge stored in the fourth S/H stage SH4, and can sense the S/H signal SN4 irrelevant to the charge stored in the third S/H stage SH3.

In one embodiment, the selector circuit 46' of the amplifier circuit 43' includes selection switches SL1, SL2, SL3 and SL4. The selection switches SL1, SL2, SL3 and SL4 are controlled by control signals SLC1, SLC2, SLC3 and SLC4 respectively to select one of the S/H signals SN1, SN2, SN3 or SN4 to be electrically connected to the gate of the read buffer transistor MR5.

Figure 25:
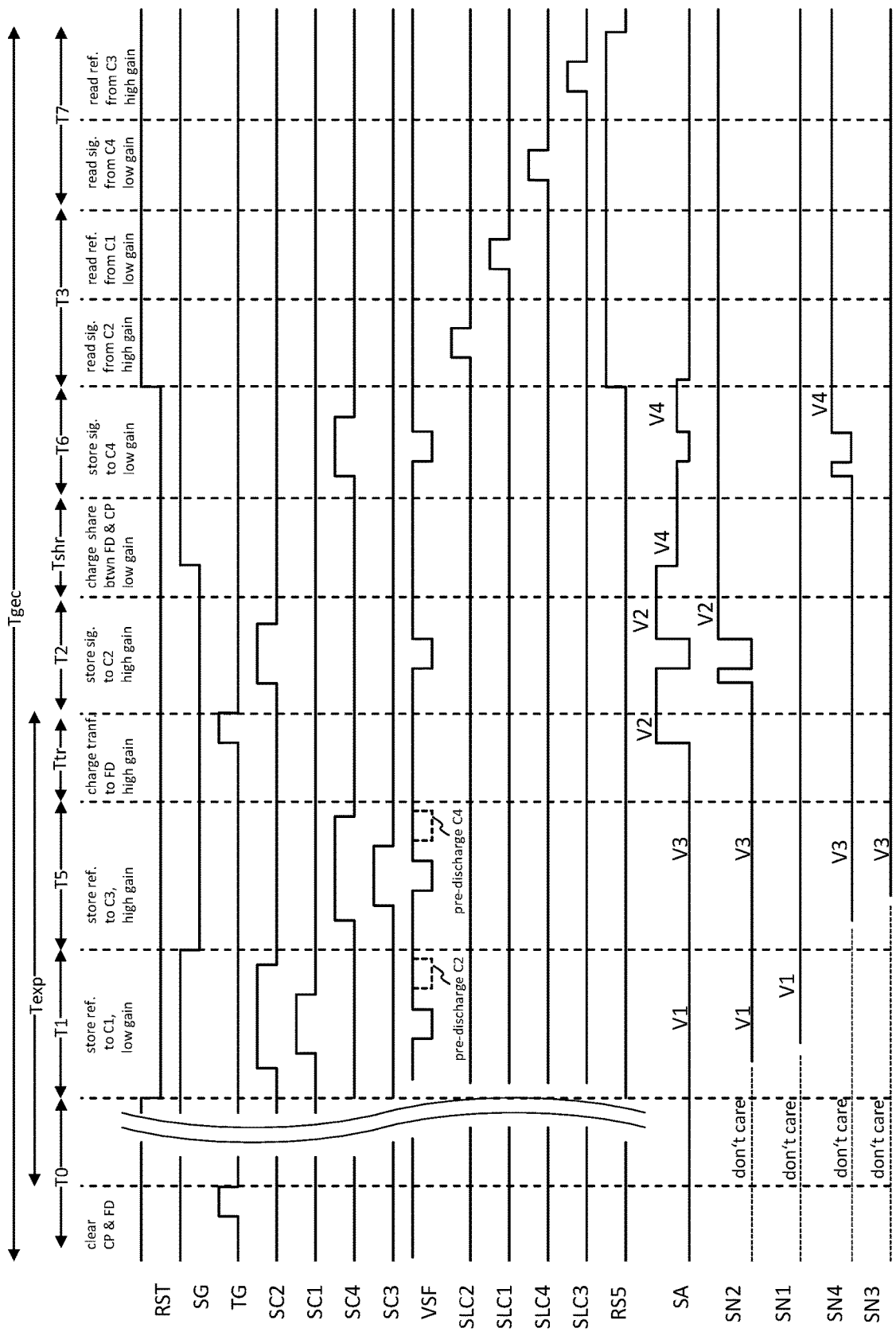
FIG. 25 shows specific operation waveforms corresponding to the embodiment of FIG. 24.

Still referring to FIG. 24 and FIG. 25, in one embodiment, the pixel circuit 124 operates in the HDR mode which switches between the first equivalent capacitance (corresponding to a low conversion gain sub-mode) and the second equivalent capacitance (corresponding to a high conversion gain sub-mode). In this embodiment, these 4 S/H stages SH1, SH2, SH3 and SH4 can sample and hold 4 voltages respectively corresponding to a reset state and a sensing state in both a high conversion gain sub-mode and a low conversion gain sub-mode. In addition, the amplifier circuit 43' can sense the voltages of these 4 S/H stages independently to generate a first output signal, a second output signal, a third output signal and a fourth output signal. In one embodiment, the first output signal, the second output signal, the third output signal and the fourth output signal correspond to for example the reference signal in the low conversion gain sub-mode, the sensed signal in the high conversion gain sub-mode, the reference signal in the high conversion gain sub-mode, and the sensed signal in the low conversion gain sub-mode respectively. An HDR offset compensated signal is generated according to the first output signal, the second output signal, the third output signal and the fourth output signal. Note that in this embodiment, the HDR offset compensated signal achieves HDR and dark noise calibration (i.e. the reset state) at the same time.

As a non-limiting example, one of the S/H stages SH1 and SH3 can sample and hold the reference signal in the high conversion gain sub-mode and the other can sample and hold the reference signal in the low conversion gain sub-mode; and one of the S/H stages SH2 and SH4 can sample and hold the sensed signal in the high conversion gain sub-mode and the other can sample and hold the reference signal in the low conversion gain sub-mode.

FIG. 25 shows specific operation waveforms of one embodiment for operating the pixel circuit 124. Referring to FIG. 24 and FIG. 25, in one embodiment, the pixel circuit 124 operates according to the following timing sequence: T1, T5, T2, T6, T3 and T7. The corresponding detailed operations will be described later.

Referring to FIG. 24 and FIG. 25, during the time period T1, the second S/H stage SH2 samples the buffered output signal SA to generate a second S/H signal SN2 having a first voltage V1 at the node N2. The first S/H stage SH1 samples and holds the second S/H signal SN2 having the first voltage V1 to generate the first S/H signal SN1 having the first voltage V1 during the first time period T1, as shown in FIG. 25.

Note that, in this embodiment, during the time period T1, the adjusting signal SG is high to turn on the adjusting switch MSG, such that the pixel circuit is in the low conversion gain sub-mode. The first voltage V1 relates to a first state of the floating diffusion node FD, which corresponds to the reset state in the low conversion gain sub-mode.

Next, during the time period T5, the fourth S/H stage SH4 samples the buffered output signal SA to generate a fourth S/H signal SN4 having a third voltage V3 at the node N4. The third S/H stage SH3 samples and holds the fourth S/H signal SN4 having the third voltage V3 during the time period T5 of the global exposure cycle Tgec, to generate the fourth S/H signal SN4 which also has the third voltage V3 during the time period T5, as shown in FIG. 25.

Note that, in this embodiment, during the time period T5, the adjusting signal SG is low to turn off the adjusting switch MSG, such that the pixel circuit is in the high conversion gain sub-mode. The third voltage V3 relates to a third state of the floating diffusion node FD, which corresponds to the reset state in the high conversion gain sub-mode.

Next, during the time period T2, in this embodiment, the second S/H stage SH2 samples and holds the buffered output signal SA to generate the second S/H signal SN2 having the second voltage V2, wherein the second voltage V2 of the buffered output signal SA (also the second S/H signal SN2) represents the level of the charge level sensed by the photo diode PD during the exposure time period Texp and trans-ferred to the floating node FD during the transfer time period Ttr as shown in FIG. 25, in the high conversion gain sub-mode.

Note that, in this embodiment, during the time periods Ttr and T2, the adjusting signal SG is low to turn off the adjusting switch MSG, such that the pixel circuit is in the high conversion gain sub-mode. The second voltage V2 relates to a second state of the floating diffusion node FD, which corresponds to the sensing state in the high conversion gain sub-mode.

Also note that, in this embodiment, before the time period T2, during the time period Ttr, charge of the photo-sensitive element 10 after an exposure time period Texp is fully transferred to the floating diffusion node FD having the second equivalent capacitance (lower) by pulsing the transfer gate MTG in Ttr as shown in FIG. 17, so as to generate second S/H signal SN2 having the second voltage V2 (and later the second output signal accordingly).

Still referring to FIG. 25, next, during the time period T6, in this embodiment, the fourth S/H stage SH4 samples and holds the buffered output signal SA to generate the fourth voltage V4, wherein the fourth voltage V4 of the buffered output signal SA (also the fourth S/H signal SN4) represents the level of the charge level sensed by the photo diode PD during the exposure time period Texp and redistributed in the low conversion gain sub-mode during the time period Tshr as shown in FIG. 25.

Note that, in this embodiment, during the time period T6, the adjusting signal SG is high to turn on the adjusting switch MSG, such that the pixel circuit is in the low conversion gain sub-mode. The fourth voltage V4 relates to a fourth state of the floating diffusion node FD, which corresponds to the sensing state in the low conversion gain sub-mode.

Also note that, in this embodiment, before the time period T6, during the time period Tshr, the charge of the floating diffusion node FD (after the time period Texp and T2) is redistributed according to the first equivalent capacitance (i.e. from Cfd to Cfd plus CP) in Tshr by turning on the adjusting switch MSG as shown in FIG. 25, so as to generate the fourth S/H signal SN4 having the fourth voltage V4 (and later the fourth output signal accordingly).

Still referring to FIG. 25, next, in one embodiment, the first voltage V1, the second voltage V2, the third voltage V3 and the fourth voltage V4 are sensed by the amplifier circuit 43 independently during time periods T3 and T7 as shown in FIG. 25 for generating the corresponding first output signal, the corresponding second output signal, the corresponding third output signal and the corresponding fourth output signal.

Note that the first output signal, the second output signal, the third output signal and the fourth output signal can correspond to the corresponding signals being read from the pixel line PXO or correspond to the corresponding digital forms converted by the ADC (referring to the ADC 80 in FIG. 2), an HDR offset compensated signal is generated according to the first output signal, the second output signal, the third output signal and the fourth output signal.

A shown in FIG. 24, in one embodiment, each of S/H stages (e.g. the first S/H stage SH1, the second S/H stage SH2, the third S/H stage SH3 and the fourth S/H stage SH4 includes a holding capacitor (e.g. C1, C2, C3 and C4 respectively) connected to the output of the corresponding S/H stage, and a sampling switch (S1, S2, S3 and S4 respectively) connected between the input and the output of the corresponding S/H stage. The sampling switches S1, S2, S3 and S4 are controlled by control signals SC1, SC2, SC3 and SC4 respectively.

The present invention provides a pixel circuit having 2 S/H stages which are connected in cascade and sample and hold signals corresponding to different states, modes or sub-modes in a serial manner, while each of the S/H signals can be sensed independently. The pixel circuit of the present invention can further be configured to cancel noise, sense corresponding signals in high conversion gain mode, low conversion gain mode or HDR mode. An array formed by plurality of the pixel circuits can be arranged in a global shutter imager achieving high speed, high precision and flexible sensitivity.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A pixel circuit, comprising:
   a photo-sensitive element, configured to operably generate charge in response to incident radiation;
   a floating diffusion node;
   a reset transistor, configured to operably dissipate charge on the floating diffusion node;
   a transfer gate, connected between the photo-sensitive element and the floating diffusion node, configured to operably control transfer of charge to the floating diffusion node;
   a buffer amplifier having an input connected to the floating diffusion node, configured to operably generate a buffered output signal according to a voltage on the floating diffusion node;
   an amplifier circuit;
   a first sample-and-hold (S/H) stage; and
   a second S/H stage, wherein the first S/H stage and the second S/H stage are connected in cascade between the buffer amplifier and the amplifier circuit;
   wherein the second S/H stage is configured to operably sample, or to operably sample and hold the buffered output signal to generate a second S/H signal, and the first S/H stage is configured to operably sample and hold the second S/H signal to generate a first S/H signal;
   wherein the amplifier circuit is electrically connected to the output of the first S/H stage and an output of the second S/H stage independently;
   wherein during a first time period of a global exposure cycle, the second S/H stage samples the buffered output signal having a first voltage to generate the second S/H signal having the first voltage, and the first S/H stage samples and holds the second S/H signal to generate the first S/H signal having the first voltage, wherein the first voltage relates to a first state of the floating diffusion node;
   wherein during a second time period of the global exposure cycle, the second S/H stage samples and holds the buffered output signal having a second voltage to generate the second S/H signal having the second voltage, wherein the second voltage relates to a second state of the floating diffusion node;
   wherein during a third time period, the first S/H signal having the first voltage and the second S/H signal having the second voltage are sensed by the amplifier circuit independently for generating a first output signal and a second output signal correspondingly.

2. The pixel circuit of claim 1, wherein the amplifier circuit senses the first S/H signal without the need of sensing the second S/H signal, and senses the second S/H signal without the need of sensing the first S/H signal.

3. The pixel circuit of claim 1, wherein the amplifier circuit includes:
   a first read amplifier having an input for receiving the first S/H signal; and
   a second read amplifier having an input for receiving the second S/H signal;
   wherein during an equalizing time period, the first S/H signal and the second S/H signal are equalized such that both the first S/H signal and the second S/H signal have an equalized voltage;
   wherein during a fourth time period, the first read amplifier senses the first S/H signal having the equalized voltage for generating a first offset signal and the second read amplifier senses the second S/H signal having the equalized voltage for generating a second offset signal.

4. The pixel circuit of claim 3,
   wherein an offset compensated signal is generated according to the first output signal, the second output signal, the first offset signal and the second offset signal.

5. The pixel circuit of claim 4,
   wherein the first state corresponds to a reset state, wherein in the reset state, charge on the floating diffusion node is fully dissipated by pulsing the reset transistor; and
   wherein the second state corresponds to a sensing state, wherein in the sensing state, charge of the photo-sensitive element after an exposure time period is fully transferred to the floating diffusion node by pulsing the transfer gate.

6. The pixel circuit of claim 5,
   wherein the buffer amplifier includes a sense buffer transistor having a gate connected to the floating diffusion node, and a source connected to an output of the buffer amplifier for generating the buffered output signal, and a drain connected to a buffer supply signal.

7. The pixel circuit of claim 6,
   wherein prior to the sense buffer transistor sensing the first state or sensing the second state of the floating diffusion node, the buffer supply signal is pulsed low to reset the buffered output signal.

8. The pixel circuit of claim 6,
wherein the buffer amplifier further includes a current source connected to the source of the sense buffer transistor.

9. The pixel circuit of claim 6,
wherein the first read amplifier includes:
a first read buffer transistor having a gate connected to the output of the first S/H stage; and
a first read switch, connected between a source of the first read buffer transistor and an output of the first read amplifier;
wherein the second read amplifier includes:
a second read buffer transistor having a gate connected to the output of the second S/H stage; and
a second read switch, connected between a source of the second read buffer transistor and an output of the second read amplifier.

10. The pixel circuit of claim 9,
wherein the sense buffer transistor and the first read buffer transistor are formed in complementary conductive types, and/or the sense buffer transistor and the second read buffer transistor are formed in complementary conductive types, so that a level offset of the sense buffer transistor and a level offset of the of the first read buffer transistor cancel out, and/or a level offset of the sense buffer transistor and a level offset of the of the second read buffer transistor cancel out.

11. The pixel circuit of claim 3,
wherein an output of the first read amplifier and an output of the second read amplifier are shorted and connected to a pixel line.

12. The pixel circuit of claim 3,
wherein an output of the first read amplifier is connected to a first pixel line, and an output of the second read amplifier is connected to a second pixel line.

13. The pixel circuit of claim 1,
wherein a capacitance on the floating diffusion node is adjustable by an adjusting signal such that the pixel circuit operates in at least one of the following modes:
(1) a low conversion gain mode, wherein the floating diffusion node has a first equivalent capacitance;
(2) a high conversion gain mode, wherein the floating diffusion node has a second equivalent capacitance which is smaller than the first equivalent capacitance; and/or
(3) an HDR mode, wherein the floating diffusion node switches between the first equivalent capacitance and the second equivalent capacitance.

14. The pixel circuit of claim 13, further comprising:
an adjusting switch, connected between the reset transistor and the floating diffusion node and controlled by the adjusting signal; and
an adjusting capacitor, connected to a joint node of the reset transistor and the adjusting switch;
wherein when the adjusting switch is ON, the floating diffusion node has the first equivalent capacitance, wherein when the adjusting switch is OFF, the floating diffusion node has the second equivalent capacitance.

15. The pixel circuit of claim 14, wherein in the low conversion gain mode, the adjusting switch is ON,
wherein the first state corresponds to a reset state, wherein in the reset state, charge on the floating diffusion node is fully dissipated by pulsing the reset transistor; and
wherein the second state corresponds to a sensing state, wherein in the sensing state, charge of the photo-sensitive element after an exposure time period is fully transferred to the floating diffusion node by pulsing the transfer gate;
wherein a low-gain calibrated signal is generated according to the first output signal and the second output signal.

16. The pixel circuit of claim 14, wherein in the high conversion gain mode, the adjusting switch is OFF,
wherein the first state corresponds to a reset state, wherein in the reset state, charge on the floating diffusion node is fully dissipated by pulsing the reset transistor; and
wherein the second state corresponds to a sensing state, wherein in the sensing state, charge of the photo-sensitive element after an exposure time period is fully transferred to the floating diffusion node by pulsing the transfer gate;
wherein a high-gain calibrated signal is generated according to the first output signal and the second output signal.

17. The pixel circuit of claim 14, wherein in the HDR mode,
wherein the first state corresponds to a sensing state in a high conversion gain sub-mode, wherein in the sensing state in the high conversion gain sub-mode, the adjusting switch is OFF, charge of the photo-sensitive element after an exposure time period is fully transferred to the floating diffusion node having the second equivalent capacitance by pulsing the transfer gate; and
wherein the second state corresponds to a sensing state in a low conversion gain sub-mode, wherein in the sensing state in the low conversion gain sub-mode, the adjusting switch is ON, charge of the floating diffusion node is redistributed according to the first equivalent capacitance;
wherein an HDR signal is generated according to the first output signal and the second output signal.

18. The pixel circuit of claim 14, wherein the amplifier circuit includes:
a read amplifier, configured to operably sense the first S/H signal having the first voltage or the second S/H signal having the second voltage for generating the first output signal or the second output signal correspondingly; and
a selector circuit, configured to operably select one of the first S/H signal or the second S/H signal to be electrically connected to an input of the read amplifier for generating the first output signal or the second output signal correspondingly during the third time period.

19. The pixel circuit of claim 14,
wherein the buffer amplifier includes a sense buffer transistor having a gate connected to the floating diffusion node, and a source to an output of the buffer amplifier for generating the buffered output signal, and a drain connected to a buffer supply signal.

20. The pixel circuit of claim 19,
wherein prior to the sense buffer transistor sensing the first state or sensing the second state of the floating diffusion node, the buffer supply signal is pulsed low to reset the buffered output signal.

21. The pixel circuit of claim 19,
wherein the buffer amplifier further includes a current source connected to the source of the sense buffer transistor.

22. The pixel circuit of claim 14, further comprising:
a third S/H stage; and
a fourth S/H stage, wherein the third S/H stage and the fourth S/H stage are connected in cascade between the buffer amplifier and the amplifier circuit;

wherein the fourth S/H stage is configured to operably sample, or to operably sample and hold the buffered output signal to generate a fourth S/H signal, and the third S/H stage is configured to operably sample and hold the fourth S/H signal to generate a third S/H signal;

wherein the pixel circuit operates in the HDR mode;

wherein during the first time period and the second time period, the adjusting switch is OFF such that the floating diffusion node has the second equivalent capacitance;

wherein during a fifth time period of a global exposure cycle, the fourth S/H stage samples the buffered output signal having a third voltage to generate the fourth S/H signal having a third voltage, and the third S/H stage samples and holds the fourth S/H signal to generate the third S/H signal having the third voltage, wherein the third voltage relates to a third state of the floating diffusion node;

wherein during a sixth time period of the global exposure cycle, the fourth S/H stage samples and holds the buffered output signal having a fourth voltage to generate the fourth S/H signal having the fourth voltage, wherein the fourth voltage relates to a fourth state of the floating diffusion node;

wherein during the fifth time period and the sixth time period, the adjusting switch is ON such that the floating diffusion node has the first equivalent capacitance;

wherein the first state, the second state, the third state and the fourth state corresponds to a reset state in a low conversion gain sub-mode, a sensing state in a high conversion gain sub-mode, the reset state in the high conversion gain sub-mode, and the sensing state in the low conversion gain sub-mode;

wherein during a seventh time period, the first S/H signal having the first voltage and the second S/H signal having the second voltage, the third S/H signal having the third voltage and the fourth S/H signal having the fourth voltage are sensed by the amplifier circuit independently for generating the first output signal, the second output signal, a third output signal and a fourth output signal correspondingly;

wherein an HDR offset compensated signal is generated according to the first output signal, the second output signal, the third output signal and the fourth output signal.

23. The pixel circuit of claim 22,
wherein the pixel circuit operates according to the following timing sequence:
the first time period, the fifth time period, the second time period, the sixth time period, the third time period and the seventh time period.

24. The pixel circuit of claim 1,
wherein each of the first S/H stage and the second S/H stage includes:
a holding capacitor, connected to the output of the corresponding S/H stage; and
a sampling switch, connected between an input and the output of the corresponding S/H stage.

25. The pixel circuit of claim 22,
wherein each of the first S/H stage, the second S/H stage, the third S/H stage and the fourth S/H stage includes:
a holding capacitor, connected to the output of the corresponding S/H stage; and
a sampling switch, connected between an input and the output of the corresponding S/H stage.

26. A method of operating a pixel circuit, the pixel circuit including:
a photo-sensitive element, configured to operably generate charge in response to incident radiation;
a floating diffusion node;
a reset transistor, configured to operably dissipate charge on the floating diffusion node;
a transfer gate, connected between the photo-sensitive element and the floating diffusion node, configured to operably control transfer of charge to the floating diffusion node;
a buffer amplifier having an input connected to the floating diffusion node, configured to operably generate a buffered output signal according to a voltage on the floating diffusion node;
an amplifier circuit;
a first sample-and-hold (S/H) stage; and
a second S/H stage, wherein the first S/H stage and the second S/H stage are connected in cascade between the buffer amplifier and the amplifier circuit;
wherein the second S/H stage is configured to operably sample, or to operably sample and hold the buffered output signal to generate a second S/H signal, and the first S/H stage is configured to operably sample and hold the second S/H signal to generate a first S/H signal;
wherein the amplifier circuit is electrically connected to the output of the first S/H stage and an output of the second S/H stage independently;

the method comprising:
(S10): during a first time period of a global exposure cycle, storing the buffered output signal having a first voltage to the first S/H stage via the second S/H stage, wherein the first voltage relates to a first state of the floating diffusion node;
(S20): during a second time period of the global exposure cycle, storing the buffered output signal having a second voltage to the second S/H stage, wherein the second voltage relates to a second state of the floating diffusion node; and
(S20): during a third time period, sensing the first voltage and the second voltage by the amplifier circuit independently for generating a first output signal and a second output signal correspondingly.

27. The method of claim 26, wherein the amplifier circuit includes:
a first read amplifier having an input for sensing the first S/H stage; and
a second read amplifier having an input for sensing the second S/H stage;
the method further comprising:
(S35) during an equalizing time period, equalizing the first S/H stage and the second S/H stage to store a corresponding equalized voltage in both the first S/H stage and the second S/H stage;
(S40) during a fourth time period, sensing the equalized voltage from the first S/H stage by the first read amplifier for generating a first offset signal and sensing the equalized voltage from the second S/H stage by the second read amplifier for generating a second offset signal.

28. The method of claim 27, further comprising:
(S100) generating an offset compensated signal according to the first output signal, the second output signal, the first offset signal and the second offset signal.

29. The method of claim 26, further comprising:
(S05): before (S10), pulsing the reset transistor to fully dissipate charge on the floating diffusion node in the first state; and
(S15): before (S20), pulsing the transfer gate to fully transfer charge of the photo-sensitive element during a transfer time period in the second state.

30. The method of claim 26, further comprising:
adjusting a capacitance on the floating diffusion node to operate the pixel circuit optionally in at least one of the following modes:
(1) a low conversion gain mode, wherein the floating diffusion node has a first equivalent capacitance, and a low-gain calibrated signal is generated according to the first output signal and the second output signal;
(2) a high conversion gain mode, wherein the floating diffusion node has a second equivalent capacitance which is smaller than the first equivalent capacitance, and a high-gain calibrated signal is generated according to the first output signal and the second output signal; and/or
(3) an HDR mode, wherein the floating diffusion node switches between the first equivalent capacitance and the second equivalent capacitance.

31. The method of claim 30, the step of operating the pixel circuit in the HDR mode includes:
in the first state, adjusting the capacitance of the floating diffusion node to the second equivalent capacitance, and pulsing the transfer gate to fully transfer charge of the photo-sensitive element during a transfer time period;
in the second state, adjusting the capacitance of the floating diffusion node to the first equivalent capacitance; and
generating an HDR signal according to the first output signal and the second output signal.

* * * * *